(12) United States Patent
Sekino et al.

(10) Patent No.: US 8,707,096 B2
(45) Date of Patent: Apr. 22, 2014

(54) STORAGE SYSTEM, DATA BACKUP METHOD, AND SYSTEM RESTARTING METHOD OF A STORAGE SYSTEM INCORPORATING VOLATILE AND NONVOLATILE MEMORY DEVICES

(75) Inventors: Yuta Sekino, Tokyo (JP); Shinichi Nakayama, Tokyo (JP); Akira Nishimoto, Tokyo (JE); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 13/265,715

(22) PCT Filed: Oct. 12, 2011

(86) PCT No.: PCT/JP2011/005693
§ 371 (c)(1),
(2), (4) Date: Oct. 21, 2011

(87) PCT Pub. No.: WO2013/054374
PCT Pub. Date: Apr. 18, 2013

(65) Prior Publication Data
US 2013/0097458 A1    Apr. 18, 2013

(51) Int. Cl.
*G06F 11/00* (2006.01)

(52) U.S. Cl.
USPC .......................................................... 714/14

(58) Field of Classification Search
USPC .............................. 714/6.3, 14, 22
See application file for complete search history.

(56) References Cited

U.S. PATENT DOCUMENTS

| | | | |
|---|---|---|---|
| 5,007,027 A * | 4/1991 | Shimoi | 365/229 |
| 7,596,643 B2 * | 9/2009 | Merry et al. | 710/56 |
| 7,606,976 B2 * | 10/2009 | Raghuvanshi | 711/118 |
| 7,613,877 B2 * | 11/2009 | Shimozono et al. | 711/113 |
| 7,859,899 B1 * | 12/2010 | Shakeri et al. | 365/185.08 |
| 2003/0033548 A1 * | 2/2003 | Kuiawa et al. | 713/300 |
| 2005/0071697 A1 | 3/2005 | Batchelor et al. | |
| 2007/0094446 A1 | 4/2007 | Sone et al. | |
| 2007/0245076 A1 * | 10/2007 | Chang et al. | 711/112 |
| 2008/0086659 A1 | 4/2008 | Ishikawa et al. | |

(Continued)

FOREIGN PATENT DOCUMENTS

| | | |
|---|---|---|
| GB | 2437102 A | 10/2007 |
| JP | 2002358169 A | 12/2002 |

(Continued)

*Primary Examiner* — Scott Baderman
*Assistant Examiner* — Joseph Kudirka
(74) *Attorney, Agent, or Firm* — Volpe and Koenig, P.C.

(57) ABSTRACT

In a storage system for performing data backup using a battery during blackout, when the blackout continues for a long time, problems such as the loss of volatile memory data due to the consumption of battery capacity and the difference in recovery time between controller units after power recovery occur during restarting of the system. The present invention solves the problems by selecting (a1) battery backup or (a2) saving of data in a nonvolatile device based on the battery capacity or setting of modes, and selecting (b1) inhibiting restart of the system or (b2) storing of data in the volatile memory to a nonvolatile memory means and performing access via write-through based on the remaining capacity of the battery when restarting the system after power recovery. Further, the system enables to increase and decrease the volatile memory capacity of the write area and mutually confirms synchronization of controller units and contents of volatile memories. Thereby, the system enables to prevent data loss and inconsistency of data.

16 Claims, 19 Drawing Sheets

(56) References Cited

U.S. PATENT DOCUMENTS

| | | |
|---|---|---|
| 2009/0249008 A1 | 10/2009 | Hosaka |
| 2010/0229018 A1* | 9/2010 | Hutchison et al. ............ 713/340 |
| 2010/0257385 A1 | 10/2010 | Hutchison et al. |
| 2011/0197036 A1* | 8/2011 | Ishii .............................. 711/155 |

FOREIGN PATENT DOCUMENTS

| | | |
|---|---|---|
| JP | 4235919 | 3/2009 |
| JP | 4235919 B2 | 3/2009 |
| JP | 2009237881 A | 10/2009 |

* cited by examiner

Fig. 2

| LU (Logical Unit) number | RG (RAID Group) number | HDD number |
|---|---|---|
| 0x000 | 0x00 | 0x00,0x01,0x02 |
| 0x001 | 0x00 | 0x00,0x01,0x02 |
| 0x002 | 0x01 | 0x03,0x04,0x05,0x06 |
| 0x003 | 0x01 | 0x03,0x04,0x05,0x06 |
| 0x004 | 0x01 | 0x03,0x04,0x05,0x06 |
| 0x005 | 0x02 | 0x07,0x08,0x09 |
| 0x006 | 0x02 | 0x07,0x08,0x09 |
| 0x007 | 0x02 | 0x07,0x08,0x09 |
| 0x008 | 0x03 | 0x0A,0x0B,0x0C |
| 0x009 | 0x04 | 0x0D,0x10,0x11 |
| 0x00A | 0x04 | 0x0D,0x10,0x11 |
| 0x00B | 0x05 | 0x0F,0x12,0x13 |
| ⋮ | ⋮ | ⋮ |

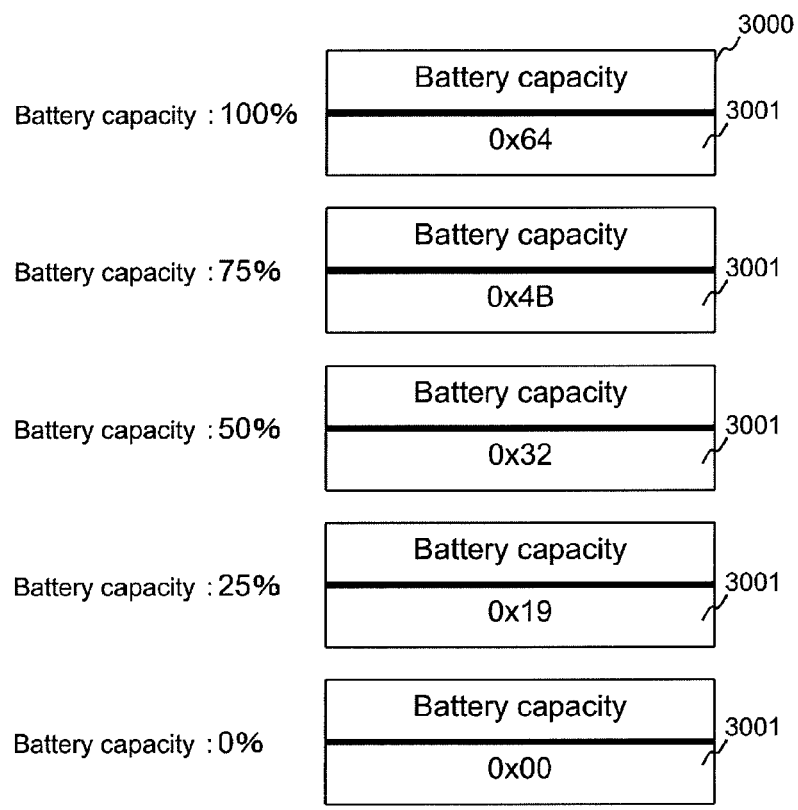

STORAGE SYSTEM, DATA BACKUP METHOD, AND SYSTEM RESTARTING METHOD OF A STORAGE SYSTEM INCORPORATING VOLATILE AND NONVOLATILE MEMORY DEVICES

TECHNICAL FIELD

The present invention relates to an information system such as a storage device or a general-purpose computer which adopts an art suitable for protecting the data within the system and restarting the system after power recovery when power supply to the system is stopped.

BACKGROUND ART

Information systems for storage devices, general-purpose computers and servers use a large number of DRAMs (Dynamic Random Access Memory) which are volatile memories. Therefore, when power supply from the exterior is interrupted, the data stored in the volatile memory is lost. Therefore, the information system saves the contents of stored data during interruption of power supply either by feeding power to a volatile memory using a data backup battery and saving data in the volatile memory or by storing data in a nonvolatile memory for saving data.

Incidentally, there are a short-time blackout and a long-time blackout in the interruption of power supply. The short-time blackout includes "instantaneous voltage drop", "momentarily blackout" and "instantaneous blackout". "Instantaneous voltage drop" refers to a state where the voltage of a line power supply drops instantaneously (for several milliseconds to several seconds). "Momentarily blackout" refers to a state where the line power supply is turned off instantaneously (for several milliseconds to several seconds). "Instantaneous blackout" refers to a state where the line power supply is turned off instantaneously (for several milliseconds to several seconds), which is generally longer than momentarily blackout.

In addition, the short-time blackout generally occurs more frequently than the long-time blackout. According to the state of occurrence of instantaneous voltage drops in Japan (the art disclosed in patent literature 2), an instantaneous voltage drop with a 20% voltage drop ratio and approximately three-cycle continuous time most frequently occurs. The blackout characteristics, such as the blackout type or the total time of occurrence of blackout per year, differ among countries and regions.

Patent literatures 1 through 3 disclose examples of the prior art mentioned above.

The art disclosed in patent literature 1 relates to an information processing system which saves data in a volatile memory to a nonvolatile memory when power is off. The information processing system comprises a detecting circuit for outputting a momentary interruption detecting signal when a power source voltage is below a first threshold voltage, and a power failure detecting signal when the power source voltage is below a second threshold voltage that is lower than the first threshold voltage. When the detecting circuit has output the momentary interruption detecting signal, the information processing system starts saving the data in the volatile memory into the nonvolatile memory. Thereafter, when the detecting circuit has output the power failure detecting signal, the data processing apparatus continues the saving of the data while carrying out a predetermined shutdown processing.

According to the disk array device (backup system) disclosed in patent literature 2, when a blackout occurs, backup of data is performed via a first backup method (performing self-refreshing of the volatile memory via the power supplied from a battery to store the data in the memory). The disk array device integrates the backup time, the battery discharge currents and the like via the first backup method. Thereafter, at a timing when the integrated value satisfies a predetermined condition, the disk array device switches the backup method from the first backup method to a second backup method and evacuates data from the volatile memory to a nonvolatile memory.

Patent literature 3 discloses a semiconductor disk device having a first volatile memory, a second volatile memory, and a third non-volatile memory having the same capacity, so as to maintain the completeness and consistency (uniqueness) of data evacuation. When power is conducted from an external power supply, the semiconductor disk device forms a duplex structure via the first volatile memory and the second volatile memory. When blackout occurs, the semiconductor disk device releases the duplex structure and saves the contents of the second volatile memory to the third nonvolatile memory. When the external power supply is restored during the saving operation, the first volatile memory performs data transfer to an upper level host in response to a reading or writing command from the upper level host.

CITATION LIST

Patent Literature

PTL 1: Japanese Patent No. 4235919 (US Patent Application Publication No. 2008/0086659)
PTL 2: Japanese Patent Application Laid-Open Publication No. 2009-237881(US Patent Application Publication No. 2009/0249008)
PTL 3: Japanese Patent Application Laid-Open Publication No. 2002-358169

SUMMARY OF INVENTION

Technical Problem

However, there is a drawback according to the method for feeding power to a volatile memory from a data backup battery and saving data in the volatile memory that if the blackout continues for a long period of time, no capacity will be left in the battery, according to which the volatile memory cannot receive power supply and the data saved in the cache memory will be lost.

Further, there is a drawback according to the method for storing the data in a nonvolatile memory for saving data that the load will become high since data must be saved even during instantaneous blackout, so that if instantaneous blackout occurs continuously, the data will be lost as a result, and that according to the remaining capacity of the battery, not all the data in the cache memory can be saved in the nonvolatile memory for saving data.

Therefore, when short-time blackout and power recovery occurs repeatedly and successively, the initial data backup (saving of data) prior to blackout can be performed. However, due to final consumption of the battery, the updated data of the contents of the first volatile memory performed in response to the reading or writing command from the upper level host during power recovery cannot be backed up. Further, even if power supply is recovered completely and normal operation of the system is enabled, the recovered data is still the data corresponding to the data prior to the initial blackout since the updated contents of the first volatile memory is lost. In other words, the data updated in response to the reading or writing command from the upper level host during power recovery cannot be recovered and data consistency is deteriorated.

In other words, there is a drawback according to the method for feeding power to the volatile memory from a data backup battery and saving data in the volatile memory that if the blackout continues for a long period of time, no capacity will be left in the battery, according to which the volatile memory cannot receive power supply and the data saved in the cache memory will be lost. Further, there is a drawback according to the method for storing the data in a nonvolatile memory for saving data that the load will become high since data must be saved even during instantaneous blackout, so that if instantaneous blackout occurs continuously, the data will be lost as a result, and that according to the remaining capacity of the battery, not all the data in the cache memory can be saved in the nonvolatile memory for saving data.

Therefore, the object of the present invention is to provide a method for protecting data in a storage system when interruption of power supply occurs and for restarting the system after power recovery, capable of realizing the maintainability and consistency of data while cutting down restarting time.

Solution to Problem

In order to solve the problems mentioned above, the present invention provides a storage coupled to a computer or a management computer, the storage system having one or more controller units, one or more power supply units and one or more battery units, and a drive unit having a plurality of nonvolatile devices, the controller unit comprising a control unit, a volatile memory and a nonvolatile memory device, the power supply unit being coupled to the battery unit and including an external power input unit and a power supply control unit, wherein when power supply from an exterior is interrupted, the controller unit determines the content of interruption of power supply from the exterior, and based on the determination result and a data backup mode information set via the management computer, selects whether to continue retaining the data stored in the volatile memory in the volatile memory or to store the data in the nonvolatile memory device and retain the data therein.

Moreover, when the system selects to retain data in the volatile memory, the system further selects whether to retain the data in the volatile memory or to store the data in the nonvolatile memory device and retain the data therein based on a capacity of the battery. The data stored in the volatile memory or the nonvolatile memory device is composed of a management information data and a user data.

In addition, the volatile memory includes a read data storage area for storing a read data read from a plurality of nonvolatile devices and a write data storage area for storing the data written from the computer, and when the system selects to retain data in the volatile memory, a capacity of the write data storage area or the total capacity of the volatile memory is increased or decreased based on the capacity of the battery. Furthermore, the system selects a mode for writing data to the write data storage area of the volatile memory between a write-back mode and a write-through mode based on the capacity of the battery.

Further according to the system, whether to inhibit restarting of the storage system or to restart the system and select a write-through mode for the write access to the volatile memory when power supply is resumed is selected, and after inhibiting restarting of the system or after restarting the system, the remaining capacity of the battery is monitored, and when the capacity exceeds a predetermined threshold, restarting of the system is started or the mode of write access to the volatile memory is changed from the write-through mode to the write-back mode. Moreover, when power supply is resumed, the system monitors the remaining capacity of the battery for saving data from the nonvolatile memory device to the volatile memory, and when the capacity exceeds a predetermined threshold, restarting is started or the write access mode to the nonvolatile memory is changed from the write-through mode to the write-back mode.

According to the system, during restarting of the system after power supply is resumed, the following steps are performed: (P11) data is migrated from the nonvolatile memory device to the volatile memory, (P12) data consistency is confirmed by comparing the data in the nonvolatile memory device and the data migrated to the volatile memory, (P13) after confirming consistency, the data in the nonvolatile memory device is deleted, (P14) the management information data in the volatile memory is stored in the nonvolatile device, (P15) the a storage system is shifted to a normal state, and (P16) the user data in the volatile memory is stored to the nonvolatile device and the user data in the volatile memory is deleted.

Further according to the system, during restarting of the system after power supply is resumed, the following steps are performed: (P21) data is migrated from the nonvolatile memory device to the volatile memory, (P22) data consistency is confirmed by comparing the data in the nonvolatile memory device and the data migrated to the volatile memory, (P23) after confirming consistency, the management information data in the volatile memory is stored in the nonvolatile device, (P24) the user data in the volatile memory is stored to the nonvolatile device and the user data in the volatile memory is deleted, and (P25) the management information data is deleted from the volatile memory. Even further according to the system, during restarting of the system after power supply is resumed, the following steps are performed: (P31) synchronization of controller units is checked, and (P32) contents of the data in the volatile memories of the controller units are mutually checked and the data are matched.

In the system, the management computer performs the display of current battery remaining capacity, backup available time, and the total capacity or the write area capacity of the volatile memory, and the setting of the data backup mode, the backup time, the write area capacity of the volatile memory and the setting of the restart mode of the storage system or the battery capacity threshold.

Advantageous Effects of Invention

The present invention provides a storage system capable of protecting data when power supply is interrupted.

BRIEF DESCRIPTION OF DRAWINGS

FIG. 2 shows an example of configuration of an LU-RG-HDD management table according to the present invention.

FIG. 3 shows an example of configuration of a battery capacity management table according to the present invention.

DESCRIPTION OF EMBODIMENTS

Now, an example of the preferred embodiments of the present invention will be described with reference to the accompanying drawings. In the present embodiments, the areas composed of identical structural members and denoted with the same reference numbers basically perform identical operations. One example of the products to which the present invention is applied is a storage device, but the products are not restricted thereto. The products can include a host computer or a client PC for performing operations such as the saving of data or other functions within the device in a battery. Further, the information system can include a single storage device or a host computer, or can use multiple products in combination.

Now, the data backup method in a storage system during blackout according to the present invention will be described with reference to FIGS. 1 through 9 and FIG. 19.

The present backup method enables to prevent the loss of data in the cache memory and to maintain the completeness of data by selecting whether to save the data in the cache memory into a flash memory or to store the data in the cache memory by feeding power from a battery to the cache memory when blackout occurs in the storage system.

Figure 1:
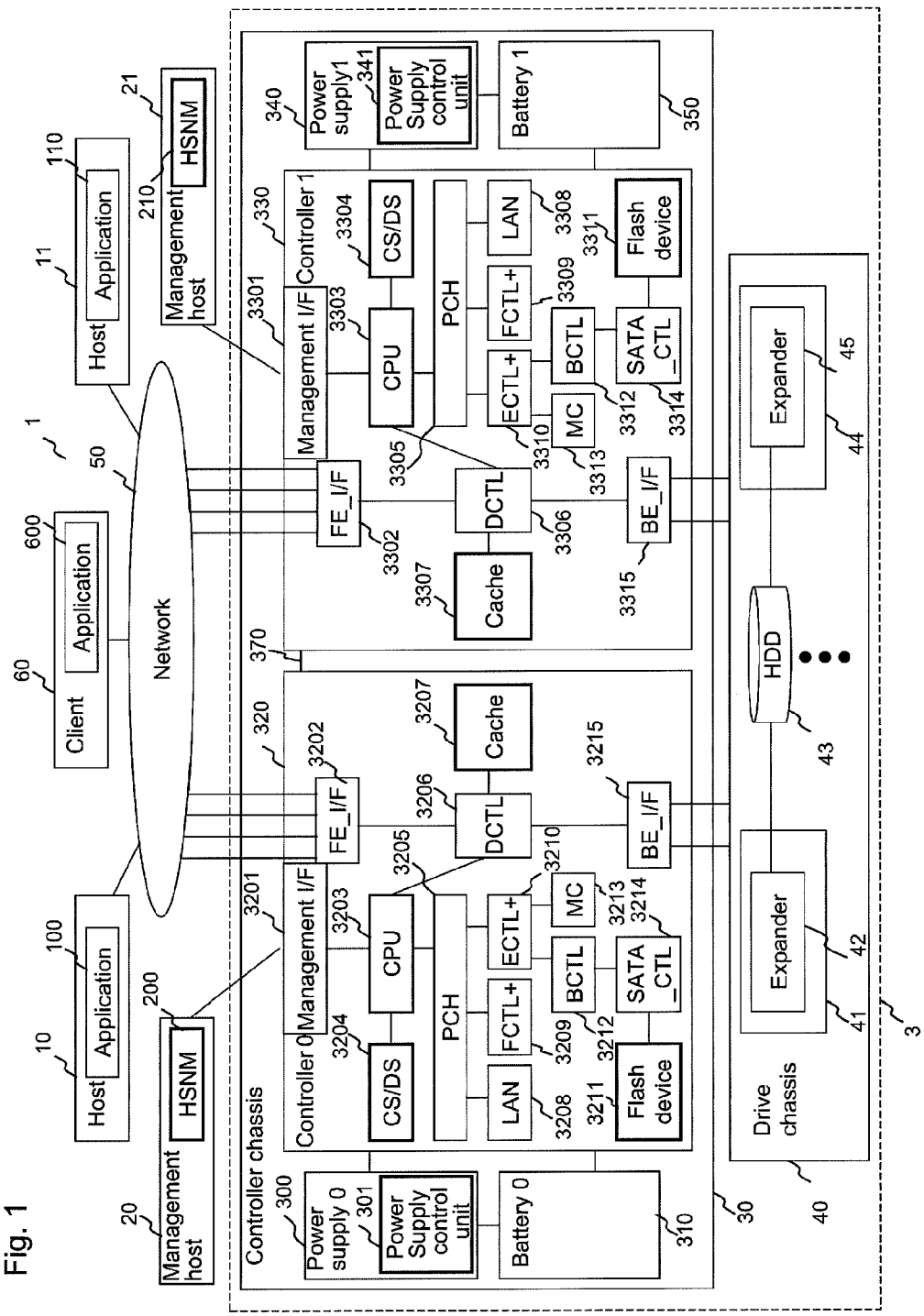
FIG. 1 shows an example of the overall configuration of an information system to which the storage device according to the present invention is applied.

At first, the overall structure of the information system having applied the present invention will be described with reference to FIG. 1. Next, the management table used for the backup operation according to the present embodiment will be described with reference to FIGS. 2 through 4. Then, the read/write access processing from the host computer (hereinafter referred to as host) to the storage device will be described with reference to FIGS. 5, 6A and 6B. Lastly, the detailed data backup method will be described with reference to FIGS. 7 through 9.

<System Configuration>

The overall configuration of the information system 1 having the present invention applied thereto will be described with reference to FIG. 1. The information system 1 is composed of a storage device 3, a host 10/11, a management computer (hereinafter referred to as management host) 20/21, and a client terminal 60. The storage device 3 and the hosts 10, 11 and the client terminal 60 are connected via a network 50. The management host 20 or the management host 21 and the storage device 3 are directly connected, but they can also be connected via the network 50. The hosts 10, 11 and the client terminal 60 respectively include application software 100, 110 and 600. The management host 20 or the management host 21 have HSNM (Hitachi Storage Navigator Modular) 200 and 210 which are storage management software.

The storage device 3 is composed of a controller chassis 30 and a drive chassis 40. To realize high reliability, the storage device 3 adopts a redundant configuration (duplicate configuration) by providing two or more power supplies (power supplies 301 and 341), batteries (batteries 310 and 350) and controller units (controller units 320 and 330) within the controller chassis 30.

The drive chassis 40 is composed of drive controller units 41 and 44 and a plurality of HDDs 43, wherein the drive controller units 41 and 44 have expanders 42 and 45 enabling to connect a greater number of HDDs than the number of HDD interface ports determined by standard. The drive chassis 40 also adopts a redundant configuration (duplicate configuration) similar to the controller chassis 30.

The power supplies 300 and 340 have power supply control units 301 and 341, respectively. The batteries 310 and 350 use a plurality of secondary battery cells such as chargeable-dischargeable lithium-ion batteries or nickel hydride batteries, capable of supplying a predetermined amount of power with predetermined DC voltage to the controller unit. The detailed internal structure and operation will be described in detail later (with reference to FIG. 7).

The controller unit 320 is composed of a management I/F 3201, an FE (Front End)_I/F 3202, a CPU 3203, a memory for storing system control information (hereinafter CS/DS) 3204, a PCH (Port Controller Hub) 3205 for connecting the CPU 3203 and the respective controllers, a data controller (hereinafter abbreviated as DCTL) 3206, a cache memory 3207, a LAN (Local Area Network) controller 3208, an FCTL+ (Flash Controller) 3209 which is a control device for controlling the startup of the device, an ECTL+ (Enclosure Controller) 3210 which is a control device for controlling the storing of environment information within the device and the environment settings, a nonvolatile memory device (flash device) 3211, a control device BCTL (Backup Controller) 3212 for controlling the backup of data, an MC (Micro Controller) 3213 for performing environment management and control within the device, a control device SATA_CTL 3214 for performing communication and control between the flash device 3211 and the BCTL 3212, and a BE (Back End)_I/F 3215.

Similarly, the controller unit 330 is also composed of a management I/F 3301, an FE_I/F 3302, a CPU 3303, a CS/DS 3304, a PCH 3305 connecting the CPU 3303 and respective controllers, a DCTL 3306, a cache memory 3307, a LAN controller 3308, a device startup control device FCTL+ 3309, a control device ECTL+ 3310 for controlling the storing of environment information within the device and the environment settings, a nonvolatile memory device 3311, a data backup control device BCTL 3312, an MC 3313 for performing environment management and control within the device, a control device SATA_CTL 3314 for performing communication and control between the flash device 3311 and the BCTL 3312, and a BE_I/F 3315. Further, the controller unit 320 and the controller unit 330 are connected via an internal I/F 370.

The management I/F 3201 enables communication between the management host 20 and the storage device 3. Information such as the settings for managing the operation of the storage device 3 (such as the path management, data backup method, LU arrangement, IO performance tuning and RAID groups) or status information of the storage device 3 (such as the used capacity and free storage capacity, IO access load and charged state of battery) are transmitted and received to and from the HSNM 200 of the management host 20 via the management I/F 3201.

The FE_I/F 3202 is composed of a controller for enabling communication between the host 10 or 11, the client 60 and the storage device 3 (control chassis 30) via the network 50, and a program operating on the controller. Similarly, the BE_I/F 3215 is composed of a controller for enabling communication between the control chassis 30 and the HDDs 43 of the drive chassis 40 and a program operating on the controller.

When a write request is output from the host 10, the host 11 or the client 60, the write command and the write data are sent via the FE_I/F 3202 to the DCTL 3206. The DCTL 3206 having received the write request stores data in the cache memory 3207. Further, the DCTL 3206 also sends the write request via the BE_I/F 3215 to the drive chassis 40 if necessary, and stores the data in the HDD 43. It is also possible to realize the communication with the hosts 10/11 and the client 60 via the LAN controller 3208 instead of via the FE_I/F 3202.

Further, when a read request is output from the host 10, the host 11 or the client 60, the read command is sent via the FE_I/F 3202 to the DCTL 3206. The DCTL 3206 determines whether the data corresponding to the read request is stored in the cache memory 3207 or the HDD 43. When data exists in the cache memory 3207, the DCTL 3206 reads the corresponding data from the cache memory 3207 and sends the data via the FE_I/F 3202 to the read request source.

When data does not exist in the cache memory 3207, the DCTL 3206 reads the corresponding data from the HDD 43 via the BE_I/F 3215. The DCTL 3206 sends the read data via the FE_I/F 3202 to the read request source.

The CPU 3203 is a processor for controlling the whole controller unit of the storage device 3. The DCTL 3206 controls the transfer of data between the cache memory 3207 and the CS/DS 3204 and between the FE_I/F 3202 and BE_I/F 3215 based on the command from the CPU 3203.

The flash device 3211 is generally composed of a rewritable nonvolatile semiconductor memory such as a flash memory, but it can also be composed of other memory devices capable of storing data without receiving power supply, such as a high speed HDD or an optical media device. In the present embodiment, the flash device 3211 is described as a nonvolatile semiconductor memory (hereinafter nonvolatile memory).

The CPU 3203 stores in the CS/DS 3204 control information such as an LU-RG-HDD management table mentioned later and a data backup mode management table, or a control program for executing access to the cache memory and the like.

The cache memory 3207 is composed of a few or a few dozen memory modules having a plurality of DDR (Double Data Rate) type synchronous volatile memory (SDRAM: Synchronous Dynamic Random Access Memory). The components of the controller unit 320 are the same as the components of the controller unit 330, so the description of components of the controller unit 330 is omitted.

The storage device 3 forms a single controller system (internal system or first system) via the power supply 300, the controller unit 320 and the drive controller unit 41, and similarly forms a single controller system (external system or second system) via the power supply 340, the controller unit 330 and the drive controller unit 45. This multiple structure enables the storage device 3 to realize a system having high reliability and high availability. The present embodiment illustrates a duplicated system, but the system can adopt a triplicated system or other multiple systems, and excluding the restarting method illustrated in FIGS. 17 and 18, the system can adopt a single system. According to the present embodiment, if the controller units of the internal system and the external system perform the same processes, a single controller unit is taken as an example for description.

<Management Table>

A management table utilized in the data backup operation process according to the present embodiment will be described with reference to FIGS. 2 to 4. First, FIG. 2 is a view showing a configuration example of a LU-RG-HDD management table. The LU-RG-HDD management table 2000 is composed of an LU (Logical Unit) number 2001 assigned to a host or a client, a RAID group number 2002 constituting the same, and a corresponding HDD (Hard Disk Drive) number 2003. For example, the LU number 0x000 that the host or the client uses (given in hexadecimal) has assigned thereto three HDDs having HDD numbers 0x00, 0x01 and 0x02 corresponding to the RG number 0x00, and the same applies for LU number 0x001. Further, the LU number 0x002 has assigned thereto four HDDs having HDD numbers 0x03, 0x04, 0x05 and 0x06 corresponding to RG number 0x01. The LU number 0x00B has assigned thereto three HDDs having HDD numbers 0x0F, 0x12 and 0x13 corresponding to RG number 0x05.

When the storage device 3 is operating in a normal state, the LU-RG-HDD management table 2000 is stored for example in the CS/DS 3204, but when the power supply is turned off by planned shutoff (such as for upgrading the system configuration or expansion), the contents of the data is saved or stored in the HDD 43.

FIG. 3 is a drawing showing an example of configuration of respective battery capacities of a battery capacity management table. The battery capacity management table 3000 stores the battery capacity (charging capacity or remaining capacity) of the battery 310. For example, when the battery capacity is "100%", it means that the storage data 3001 is "0x64" (given in hexadecimal). The numeral "100" (numeral prior to %) in decimal is "64" in hexadecimal. When the battery capacity is 75%, the value of storage data 3001 is "0x4B", wherein the numeral "75" in decimal is "4B" in hexadecimal. In the drawing, data is stored every 25%, but it can be stored in other ways, as long as the information shows the battery capacity or the state of the capacity.

The data length according to FIG. 3 is 1 byte, but it can be set to 2 bytes to store data with 0.5% resolution. A battery capacity management table 3000 corresponding to the battery 310 and a battery capacity management table 3000 corresponding to the battery 310 are respectively stored in a power supply control unit 301 and a power supply control unit 302.

Figure 4A:
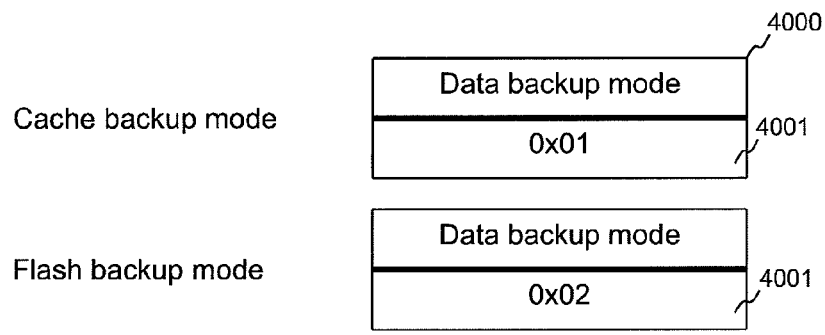
FIG. 4A shows an example of configuration of a data backup mode management table according to the present invention.

FIG. 4A is a drawing showing a data backup mode management table. The data backup mode management table 4000 stores the data backup mode which is information indicating via which mode the backup of data in the cache memory is to be performed when a short-time blackout or a long-time blackout occurs, which is set via a storage management software HSNM 200 of the management host 20. The set mode can either be always the same among multiplexed controller units or be set respectively for each of the multiplexed controller units.

The data backup mode includes the following two modes.
(BM1) Cache Backup Mode

This mode retains the data in a cache memory 3207 composed of a volatile memory via a self refresh function within the memory. The self refresh function builds a refresh circuit (timer or counter) within the memory so as to perform a refreshing process automatically. Thereby, if a refreshing command is provided once, data retention is enabled simply by supplying power to the memory, so that the power consumption of the system can be suppressed. What is meant by refreshing is that power is fed every predetermined period of time to the volatile memory so that the data in the volatile memory will not be lost.

(BM2) Flash backup mode

This mode retains and protects the data in the cache memory 3207 composed of a volatile memory by saving and storing the data in a flash device 3211 which is a nonvolatile memory means composed of a nonvolatile memory and the like.

If the data backup mode set up via the storage management software HSNM 200 of the management host 20 is a cache backup mode, "0x01" is stored in a data storage area 4001, and if it is a flash backup mode, "0x02" is stored in the data storage area 4001. The initial value prior to setting up the mode can be "0x00" or "0xFF", for example, which is different from the set values mentioned above, or can be set to "0x01" or "0x02" as a default. The data backup mode management table 4000 is stored in a CS/DS 3204 or a power supply control unit 301/302.

Figure 4B:
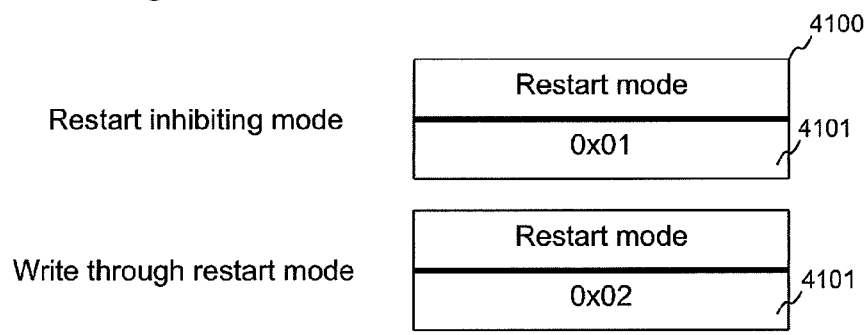
FIG. 4B shows an example of a restart mode management table according to the present invention.

FIG. 4B is a view illustrating a configuration example of a restart mode management table. The restart mode management table 4100 stores a mode for restarting the storage device 3 (executing a startup process for recovering the device from a data backup state) at the time of power recovery, which is set up via the storage management software HSNM 200 of the management host 20. The restarting mode includes the following two modes.

(RM1) Restart Inhibiting Mode

This mode does not restart the storage device 3 immediately after power is recovered, and only when triggered by the elapse of a predetermined time from power recovery or by the battery capacity being charged above a threshold, starts the restarting process of the device.

(RM2) Write Through Restart Mode

This mode restarts the storage device 3 after power recovery, but immediately after restarting, the write access mode for accessing the cache memory is set to a "write-through mode". Incidentally, the write access to the cache memory when the device is at normal operation status is a "write-back mode".

When the restart inhibiting mode is selected, the data storage area 4101 of the restart mode management table 4100 is set to "0x01", and when the write-through restart mode is selected, the data storage are 4101 is set to "0x02". This setting is performed via the storage management software HSNM 200 of the management host 20. The initial value prior to setting up the mode can be "0x00" or "0xFF", for example, which is different from the set values mentioned above, or can be set to "0x01" or "0x02" as a default. The restart mode management table 4100 is stored either in the CS/DS 3204 or the power supply control unit 301.

<Read/Write Access>

The read/write access processing of the storage device 3 will now be described with reference to FIGS. 5, 6A and 6B.

<Read Access>

Figure 5:
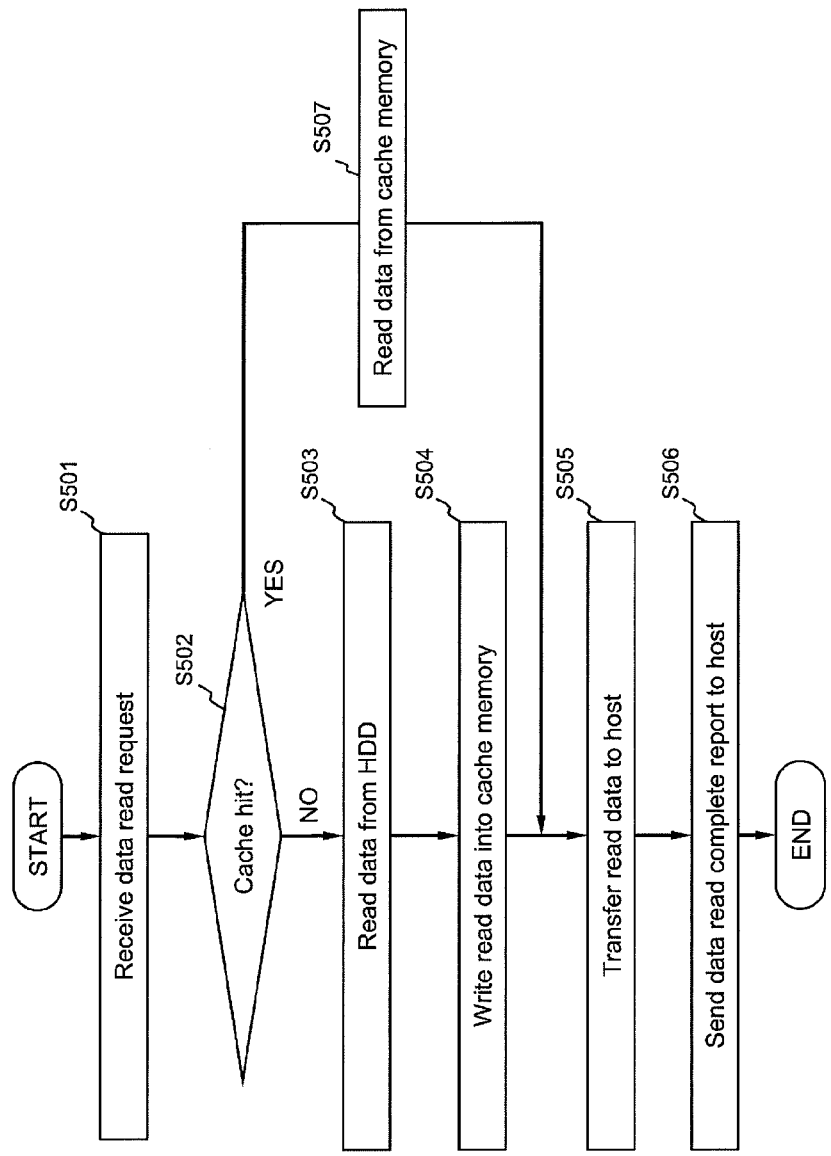
FIG. 5 is a flowchart describing a flow of read access control of the storage device according to the present invention.
Figure 6A:
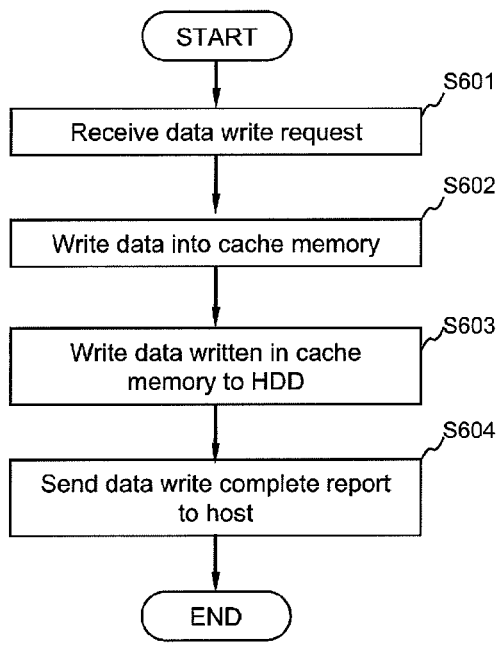
FIG. 6A is a flowchart describing a flow of write-through access control of the storage device according to the present invention.

FIG. 5 is a flowchart illustrating the read access control of the storage device 3. We will now describe the operation. The host 10 requests reading of data via the network 50 to the storage device 3. The data read request is transferred via the FE_I/F 3202 of the storage device 3 to the DCTL 3206 (step S501).

The DCTL 3206 determines whether or not the read target data exists in the cache memory 3207 based on an address information such as the LU number in the read request (step S502). The state where data exists in the cache memory 3207 is called "cache hit", and the state where data does not exist therein is called "cache mishit".

In the case of a "cache mishit" ("No" in step S502), the DCTL 3206 reads the corresponding data from the HDD 43 based on the address information and the LU-RG-HDD management table 2000 via the BE_I/F 3215 (step S503). Thereafter, the DCTL 3206 writes the data read from the HDD 43 into the cache memory 3207 (step S504). Then, DCTL 3206 sends the read data via the FE_I/F 3202 to the host 10 (step S505). After transmitting data, the storage device 3 sends a data read complete report to the host 10 (step S506).

On the other hand, in the case of a "cache hit" ("Yes" in step S502), the DCTL 3206 reads the data in the cache memory 3207 (step S507). Thereafter, the read data is transmitted to the host 10 (step S505) and a data read complete report is sent (step S506). The data read from the HDD 43 is written not only into the cache memory 3207 but also into the cache memory 3307 simultaneously to maintain data consistency among cache memories (among controller units).

<Write Access>
<Write Through Access>

Next, a write access processing of the storage device 3 will be described with reference to FIGS. 6A and 6B. FIG. 6A is a flowchart illustrating a write-through access control. A write-through access writes data into the HDD in synchronization with the writing of data to the cache memory when the host outputs a data write request. The actual operation thereof will be described with reference to FIG. 6A.

At first, the storage device 3 receives a data write request from the hosts 10 or 11 or the client 60 via the FE_IF3202 (step S601). Next, the DCTL 3206 writes the write target data into the cache memory 3207 (step S602). In synchronization with the writing of data to the cache memory 3207, the same data is written into the HDD 43 (step S603).

Finally, the storage device 3 sends a data write complete report to the host or the client as the write request source, and ends the writing process (step S604). The same data is written not only into the cache memory 3207 but also into the cache memory 3307 simultaneously to maintain data consistency among cache memories (among controller units).

<Write-Back Access>

Figure 6B:
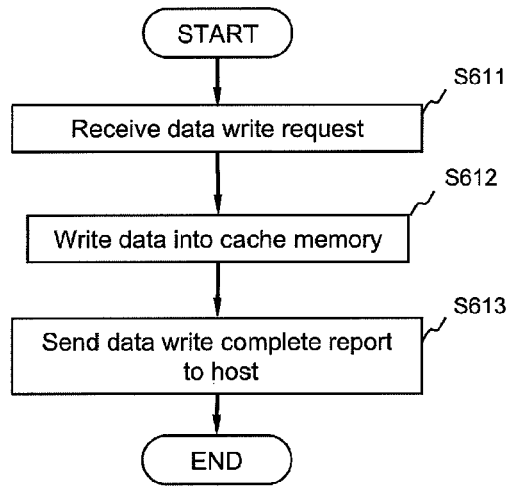
FIG. 6B is a flowchart describing a flow of write-back access control of the storage device according to the present invention.

FIG. 6B is a flowchart illustrating a write back access control. Write back access refers to writing data only into the cache memory when a data write request is output from the host, and writing data in a nonsynchronous manner to the HDD (destaging). The actual operation thereof will be described with reference to FIG. 6B.

At first, the storage device 3 receives a data write request from the host 10, 11 or the client 60 via the FE_IF 3202 (step S611). The DCTL 3206 writes the write target data into the cache memory 3207 (step S612). Finally, a data write complete report is sent to the host or the client as the write request source, and ends the write process (step S613).

Similarly as the aforementioned read access or the write-through access, the same data is written not only into the cache memory 3207 but also into the cache memory 3307 simultaneously to maintain data consistency among cache memories (among controller units). Further, the writing of data from the cache memory 3207 to the HDD 43 (destaging) is performed either periodically or at a state when there is no access to the HDD 43, asynchronously as the writing of data to the cache memory 3207. In that case, the data not yet written into the HDD can be collectively written into the HDD 43.

<Power Supply and Battery>

Figure 7:
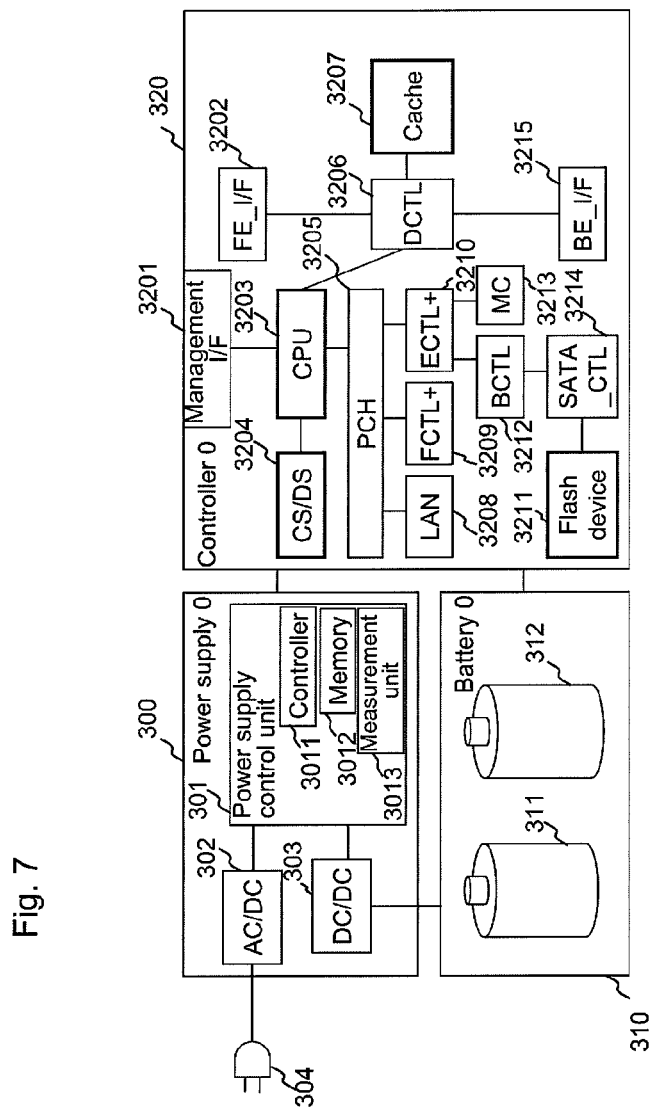
FIG. 7 is a view illustrating a configuration example of the power supply and the battery of the storage device according to the present invention.

Next, with reference to FIG. 7, the detailed configuration of the power supply 300 and the battery 310, and the outline of the operations thereof will be described. The power supply 300 is composed of a power supply control unit 301, an AC/DC converter 302 and a DC/DC converter 303. The power supply 300 receives single phase or threephase AC power having a voltage of 100 volts (V) or 200 V from an external power supply 304.

The power supply 300 converts the supplied AC power in an AC/DC converter 302 to a DC power having a predetermined voltage. The predetermined voltage can be, for example, a voltage system of approximately 50 V for charging the battery 310, a voltage system of approximately 5 V/12V for operating the HDD or the like, or a voltage system of approximately 2V/3V for operating a semiconductor device.

The DC/DC converter 330 has a function to convert the output voltage of the AC/DC converter 302 into a charging voltage of the battery and a function to convert the output voltage of the battery 310 into operation voltage of the semiconductor device.

The power supply control unit 301 is composed of a controller 3011, a memory 3012, and a measuring unit 3013. The memory 3012 stores a battery capacity management table 3000. Further, a data backup mode management table 4000 or a restart mode management table 4100 can be stored in addition to the battery capacity management table 3000. The measuring unit 3013 measures the values of voltages such as the voltage of the external power supply 304, the output voltage of the AC/DC converter 302 or the DC/DC converter or the output voltage of the battery 310. In addition, it can measure the current from the battery 310 or the operation time of the storage device 3 via the battery 310. The measuring unit 3013 notifies the measurement results to the controller 3011.

The controller 3011 stores the measurement results to the memory 3012 and sends the same to the controller unit 320. Further, the controller 3011 computes the charge capacity (remaining capacity) of the battery or the data backup available time or the like of the cache memory 3207 based on the measurement results. Moreover, the computed results are sent via the controller 3011 to the controller unit 320 in a similar manner as the measurement results.

The battery 311 and the battery 312 are composed of a plurality of lithium-ion type battery cells or nickel hydride type battery cells. The batteries 311 and 312 are connected in series or in parallel to form the battery 310. The battery 350 is formed in a similar manner. Further, a DC/DC converter is disposed within the battery 310 so as to enable power to be supplied directly to the controller unit 320 during blackout or the like. Further, it is possible to enable power to be supplied to a controller unit 330 in a different system as the controller unit 320 via an internal I/F 370.

<Data Backup Operation>
<Selection of Data Backup Mode>

Figure 8:
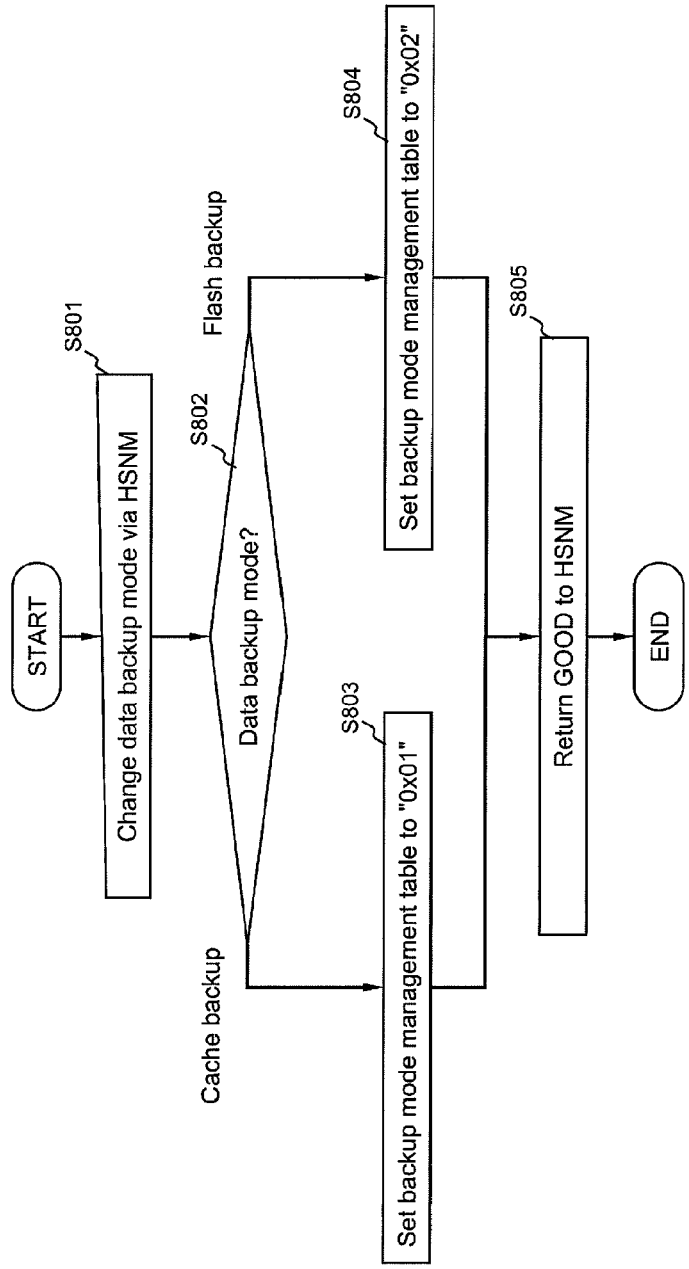
FIG. 8 is a flowchart describing a flow of operation for setting the data backup mode according to the present invention.
Figure 19:
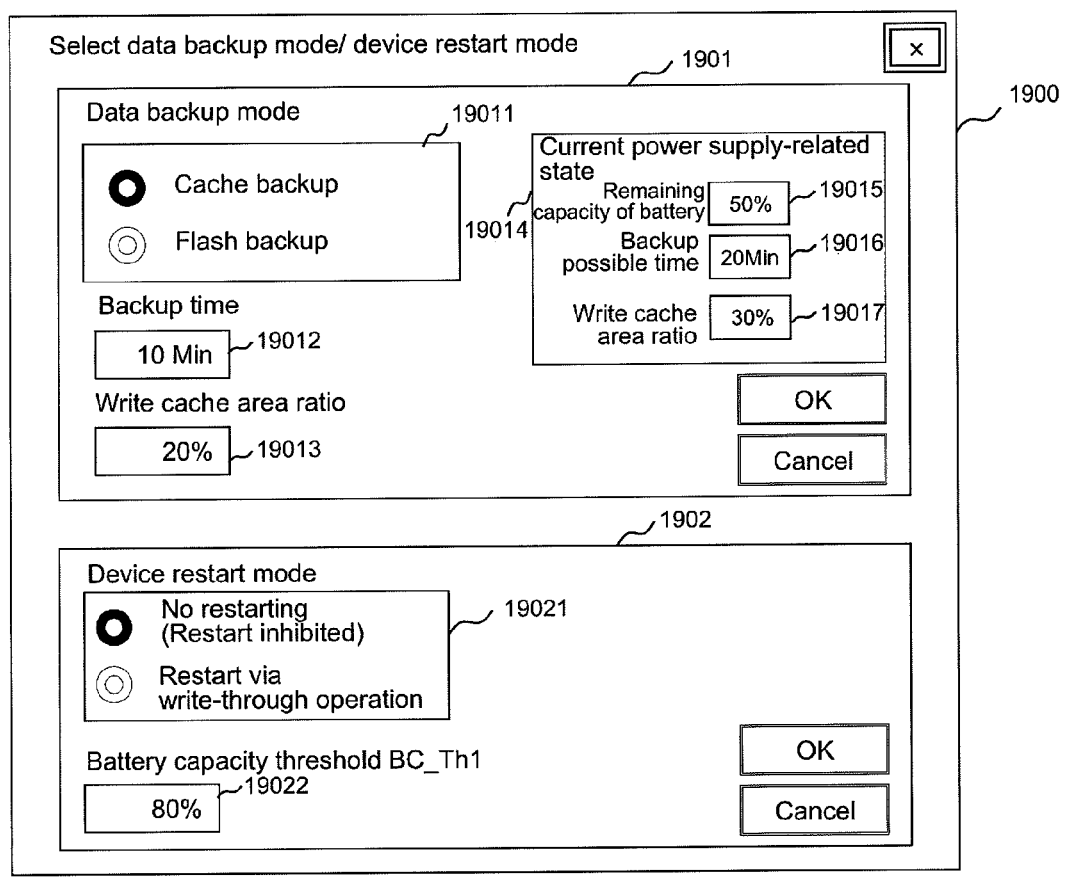
FIG. 19 is a view illustrating an example of a screen for entering mode settings and displaying system statuses according to the present invention.

Next, the data backup operation will be described with reference to FIGS. 8 and 9. FIG. 8 is a flowchart showing the operation for setting up the data backup mode. The administrator selects a data backup mode 19011 on a mode select screen 1900 (FIG. 19) of the storage management software HSNM 200 of the management host 20. In FIG. 19, the "cache backup mode" is selected. The selected mode is sent to the storage device 3, the CPU 3203 receives the selected mode via the management I/F 3201, and in the storage device 3, the change of data backup mode is recognized (step S801).

Next, the CPU 3203 determines the changed data backup mode (step S802). If the determined result is "cache backup", the data storage area 4001 of the data backup mode management table 4000 stored in the CS/DS 3204 is set to "0x01" (step S803).

On the other hand, if the determined result is "flash backup", the storage device 3 sets the data storage area 4001 of the data backup mode management table 4000 to "0x02" (step S804). If data is stored correctly to the data storage area 4001 of the data backup mode management table 4000, the storage device 3 returns "GOOD" (normal complete notification) to the storage management software HSNM 200.

<Data Backup Process>

Next, the data backup operation will be described with reference to FIG. 9. The starting of the data backup operation is triggered by the external power supply to the storage device 3 being interrupted. The measuring unit 3013 of the power supply control unit 301 monitors the input voltage from the external power supply 304 (or the DC voltage output from the AC/DC converter 302). When the voltage from the external power supply drops or turns to 0 V by interruption, the measuring unit 3013 detects the same and notifies the controller 3011. The controller 3011 having received the notification transfers the blackout information (such as power blackout or instantaneous blackout) to the controller unit 320 and the CPU 3203 of the controller unit 320 starts the process of FIG. 9.

First, the CPU 3203 determines whether the type of the blackout is "power blackout" (long-time blackout) or "instantaneous blackout" (short-time blackout) (step S901). In the case of "instantaneous voltage drop", it is either possible to determine that "instantaneous blackout" has occurred or that no blackout has occurred. If the type of the blackout is "power blackout", the CPU 3203 refers to the data storage area 4001 of the data blackout mode management table 4000 (step S902).

If the data backup mode being referred to is the "cache backup mode" (set value of the data backup mode management table 4000 is "0x01"), the power supply to the cache memory 3207 is performed via the battery, and backup of the data is performed (step S908). On the other hand, if the data backup mode is the "flash backup mode" (set value of the data backup mode management table 4000 is "0x02"), the CPU 3203 determines whether the remaining capacity of the battery 310 allows to perform the flash backup operation (method of retrieving data stored in the cache memory 3207 into the flash device 3211) once or more than once (step S905).

One example of a method for determining whether flash backup operation can be performed once or more than once executes the following steps:

(a1) calculating a saving time (write time for writing data into the flash device 3211) BT1 (Backup Time) based on the data capacity BDC (Backup Data Capacity) to be saved from the cache memory 3207 to the flash device 3211;

(a2) calculating a consumption power of the control circuit (such as the controller), the cache memory and the flash device that must be operated within the calculated data backup time (BT1) until the completion of data backup (by multiplying the calculated time BT1 by the consumption powers per unit time of the respective devices), that is, calculating the amount of data backup power;

(a3) comparing the amount of data backup power with the battery remaining capacity of the battery capacity management table 3000 stored in the memory 3012 of the power supply control unit 301; and (a4) as a result of the comparison, if the data backup power is greater than the remaining capacity, it is determined that flash backup operation is not possible, and if the data backup power is smaller than the remaining capacity, it is determined that flash backup operation can be performed once or more than once.

If the "flash backup mode" is impossible ("No" in step S905), the cache backup is performed (step S906). If the "flash backup mode" is possible ("Yes" in step S905), the flash backup is executed (step S907). On the other hand, if it is determined in step S901 that the present state is "instantaneous blackout", cache backup is performed (step S903).

Data of the storage device can be protected in a simple manner by the aforementioned arrangements and operations, so that the data loss due to blackout can be prevented and the completeness of data can be maintained. Specifically, when maintaining the data in the cache memory 3207 during power blackout by the power supply from the battery 310, there is a drawback that when the blackout continues for a long period of time, the capacity of the battery 310 will be consumed and the data will be lost. Further, if the data in the cache memory 3207 is constantly saved to the flash device 3211 during blackout, there is a drawback that the load becomes high since data must be saved even during instantaneous blackout, and continuous instantaneous blackout may cause data loss as a result, or that according to the remaining capacity of the battery 310, not all the data in the cache memory 3207 can be saved in the flash device 3211. In view of these drawbacks, the above arrangement and operation enables to solve the problem of loss of the data in the cache memory and the reduction of load to the storage device.

Figure 9:
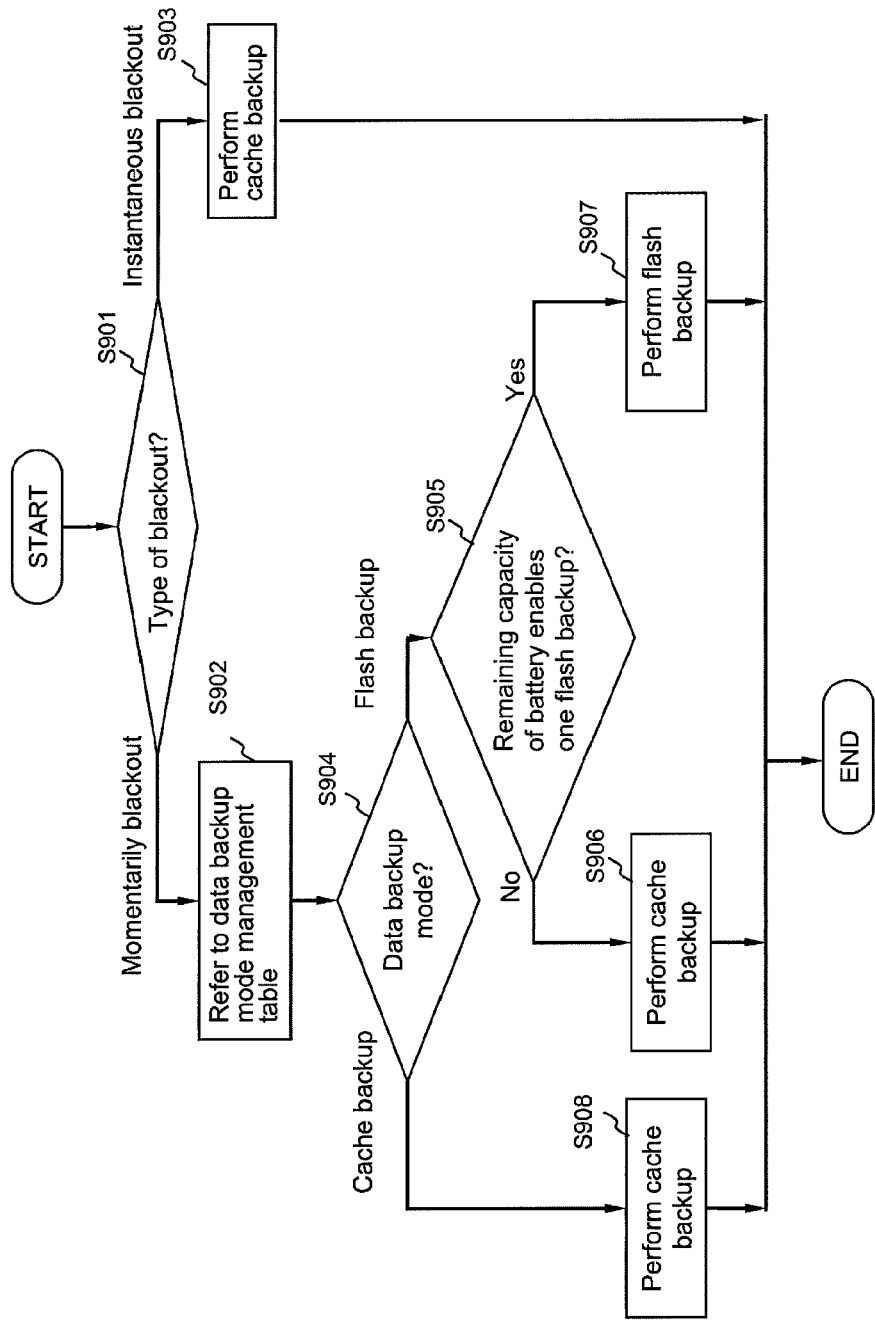
FIG. 9 is a flowchart describing a backup operation according to the present invention.

Now, the method for limiting the capacity of the cache memory that can be used in accordance with the capacity of the battery (charged capacity or remaining capacity) will be described with reference to FIGS. 10, 11 and 19. When blackout occurs, the data in the cache memory is protected by the power supplied from the battery by the methods mentioned earlier. Therefore, when blackout is restored and the storage device is restarted, the remaining capacity of the battery may be smaller than normal. Further, even after blackout, the power stored in the battery may be used to maintain the data in the cache memory while continuing I/O operation of data, and in such case, the remaining capacity of the battery will continue to decrease. Therefore, the present embodiment describes a method of performing the following steps based on the remaining capacity of the battery:

(CS1) changing the write data storage area size of the cache memory (3207A of FIG. 9); and (CS2) changing the size of the cache memory itself (3207B of FIG. 9).

This method allows the capacity of data to be saved in the flash device to be stored in the cache memory, so that it becomes possible to prevent the loss of data caused by not enabling to perform flash backup due to lack of battery capacity. Further according to this method, the capacity of data that can be subjected to data backup using the battery is stored in the cache memory for a predetermined period of time, so that until the elapse of the predetermined period of time, the loss of data in the cache memory due to the lack of remaining capacity of the battery can be prevented. According to this arrangement, it becomes possible to elongate the data backup time and to prevent data loss.

<Concept of Battery Backup Method>

Figure 10:
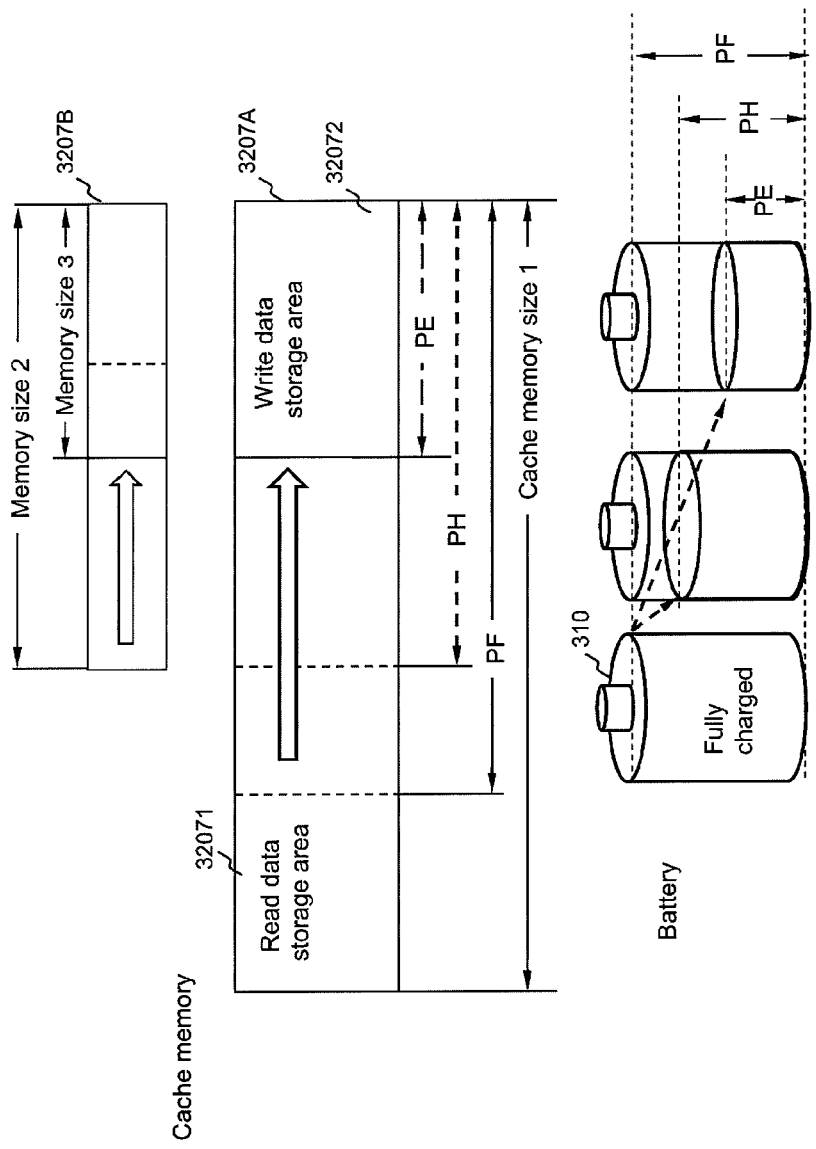
FIG. 10 is a conceptual view showing the relationship between the remaining capacity of battery and the cache memory capacity according to the present invention.
Figure 11:
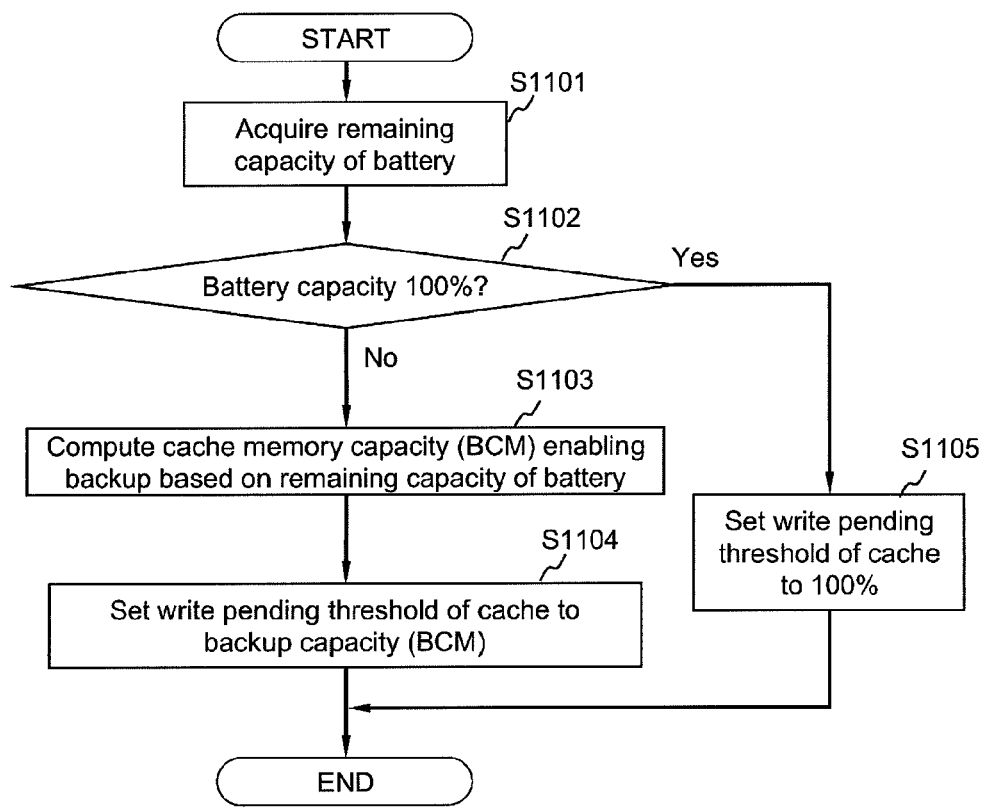
FIG. 11 is a flowchart describing a flow of operation for determining the write area capacity of the cache memory based on the battery remaining capacity according to the present invention.

At first, we will describe the concept regarding the change of cache memory size based on the battery capacity with respect to FIG. 10. The cache memory 3207 has a read data storage area 32071 for storing the frequently read data read from the HDD 43 in advance into the cache memory, and a write data storage area 32072 for storing the write data from the host or client.

The power supply 300 after power recovery charges power to the battery 310. Therefore, according to the aforementioned (CS1) method for changing the write data storage area size of the cache memory 3207, the write data storage area size 32072 is reduced along with the reduction of remaining capacity of the battery 310. According to another method, the write data storage area size 32072 is expanded along with the increase of remaining capacity of the battery 310 via power charge. However, the overall size of the cache memory 3207 is not changed. For example, in FIG. 10, when the battery 310 is "fully charged (PF: Power Full)", the write data storage area size is set to 75% of the whole area (read data storage area: 25%).

When the capacity of the battery 310 starts to reduce and the battery remaining capacity is "half (PH: Power Half)", the write data storage area size is set to 60% of the whole area (read data storage area: 40%), which is reduced compared to the "75%" of the fully charged state. When the capacity of the battery 310 is reduced further and the remaining capacity is "small (PE: Power Empty)", the write data storage area size is further reduced to 33% of the whole area (⅓) (read data storage area: 67% (⅔)).

Further, according to the aforementioned (CS2) method for changing the whole cache memory size itself (3207B), the size of the whole cache memory is reduced based on the remaining capacity of the battery. When the battery capacity is "PF", the cache memory size is used 100% as "cache memory size 1". When the battery capacity becomes "PH", only 60% of the whole cache memory size is used for the read data storage area and the write data storage area, as shown in memory size 2.

The read data storage area and the write data storage area can be set variably as in (CS1) or can be set to a predetermined ratio (for example, 40% read data area: 60% write data area). According to state "PE" in which the remaining capacity of the battery is extremely small, the cache memory size is reduced to as small as 33% (⅓). These numerical values are mere examples, and the size of the write data storage area can be set so as to enable flash backup to be performed in accordance with the remaining capacity of the battery, or the size of the write data storage area can be set so as to enable backup to be performed for a predetermined period of time in accordance with the remaining capacity of the battery.

<Size Change Operation>

Next, the operation for changing the write data storage area size of the cache memory will be described with reference to FIG. 11. At first, the measuring unit 3013 of the power supply control unit 301 measures the capacity of the battery 310. The controller 3011 acquires the result of the measurement. Then, the controller 3011 writes the measurement results to the data storage area 3001 of the battery capacity management table 3000 in the memory 3012.

The CPU 3203 of the controller unit 320 (or the microcontroller MC 3213 or other controllers) reads the data storage area 3001 of the battery capacity management table 3000 and acquires the battery remaining capacity information (step S1101).

Thereafter, the CPU 3203 determines based on the battery capacity information whether the remaining capacity is 100% (fully charged) or not (step S1102). If the battery remaining capacity is 100% (fully charged) ("Yes" in step S1102), the CPU 3203 sets the write pending threshold value of the cache memory (ratio of allocatable write data storage area size with respect to the maximum usable write data storage area size) to "100%" (capable of using the maximum write data storage area size) (step S1105). In other words, the current battery remaining ratio with respect to the battery fully charged capacity is "100%".

If the battery remaining capacity is not 100% (fully charged) ("No" in step S1102), the CPU 3203 calculates the cache memory capacity that can be used for backup (BCM: Backup Cache Memory capacity) based on the battery remaining capacity (step S1103). In other words, BCM=maximum usable write data storage size×(battery remaining capacity/battery fully charged amount). Finally, the CPU 3203 sets the calculated capacity as the write data storage area size (step S1104). Incidentally, the write pending threshold value (%) according to the present step will be the battery remaining capacity/battery fully charged amount.

Further, for example, the calculation of the capacity capable of being used for data backup (BCM) can be performed via the following steps in a similar manner as the first embodiment:

(a1) acquiring the current size of the write data storage area 32072;

(a2) calculating the data backup time BT2 to the flash device 3211 based on the acquired size;

(a3) calculating a consumption power of the control circuit (such as the controller), the cache memory and the flash device that must be operated within the calculated data backup time (BT2) until the completion of data backup to the flash device (by multiplying the calculated time by the consumption power per unit time of the respective devices), that is, calculating the amount of power required for data backup;

(a4) dividing the battery remaining capacity by the amount of power required for data backup and calculating a data backup coefficient BK1 (BK1 smaller than 100%); and (a5) setting the capacity obtained by multiplying the data backup coefficient BK1 by the maximum usable write data storage size as the new size of the write data storage area 32072.

The above-mentioned write cache capacity change process from steps S1101 through S1105 is constantly operated during battery backup, so that an optimum write area capacity (size) can be computed promptly. Thus, the deterioration of access performance to the storage device 3 can be reduced while achieving reliable data protection.

Further according to the aforementioned description, the capacity of the write data storage area is changed in accordance with the remaining capacity of the battery. However, not only the write data storage area capacity but the capacity of the overall cache memory can beset variably as according to 3207B of FIG. 10. In that case, the capacity of the whole cache memory can be set variably, and the capacity of the write data storage area (including the capacity of the read data storage area) can also be set variably. The change of capacity can use the ratio described with reference to FIG. 11 (battery remaining capacity/battery fully charged amount), for example.

When reducing the overall capacity of the cache memory, as described with reference to embodiment 1, a partial stoppage of the refreshing operation of the memory (partial refreshing operation) or the stoppage of the refreshing operation and the power supply can be performed via memory module units. Thus, the consumption power can be reduced even further, and the data backup time can be elongated according to the reduced power quantity.

Moreover, since identical data in the read data storage area 32071 exists in the HDD 43 which is a nonvolatile memory device (the data read from the HDD 43 is stored in the read data storage area 32071 of the cache memory 3207), data backup is not necessary. Thus, only the write data storage area 32072 of the cache memory 3207 can be subjected to refreshing operation and backed up, or only the data of the area can be stored in the flash device 3211.

Even further, the administrator can comprehend the battery remaining capacity 19015, the data backup available time 19016 and the write cache area ratio 19017 of the current power supply related status 19014 on the select screen of FIG. 19. Further, based on the comprehended status information, the administrator can set up the cache backup time 19012 or the write cache area ratio 19013.

As described, based on the writing of data from the host 10/11 or the client 60 to the storage device 3, the amount of data only existing in the cache memory 3207 can be reduced in accordance with the battery capacity. Thus, the flash backup described in FIG. 9 can be performed without fail even if the remaining capacity of the battery becomes extremely small, and data loss can be prevented. Moreover, a secondary battery (a rechargeable battery) is used as the battery according to the aforementioned data backup method, but a primary battery can also be used instead.

<Method for Restarting Device During Power Recovery>

We will now describe the method for restarting the storage device 3 after power recovery.

<Method for Restarting Device>

Next, the second method for restarting the storage device 3 after power recovery will be described with reference to FIGS. 13A, 13B, 14 and 15. At first, the overall flow for restarting the device will be described with reference to FIG. 13A. When the power supply 300 detects power recovery, a notice is sent to the controller unit 320. The controller (CPU 3203, FCTL+ 3209, DCTL 3206, MC 3213 and the like) of the controller unit 320 having received the notice confirms whether stored data (data saved and stored during blackout) exists in the flash device 3211 or not (step S1301). When there is no stored data ("No" in step S1301), the controller executes a normal device startup.

When stored data exists ("Yes" in step S1301), the controller confirms the set value of the data storage area 4101 of the restart mode management table 4100 (step S1302). By selecting a device restart mode 19021 on the mode select screen 1900 (FIG. 19), a restart mode is set in the restart mode management table 4100. If the set value is "0x01'", the controller determines that the mode inhibits startup of the device (restart inhibiting mode), and executes a process for not starting up the device of step S1303 (FIG. 14). According to the non-startup process S1303, as shown in FIG. 14, the saved data (management information data and user data) is left stored in the flash device 3211/3311, and the controller does not perform any process until the timing of FIG. 13B mentioned later or until the elapse of a predetermined time.

Figure 15:
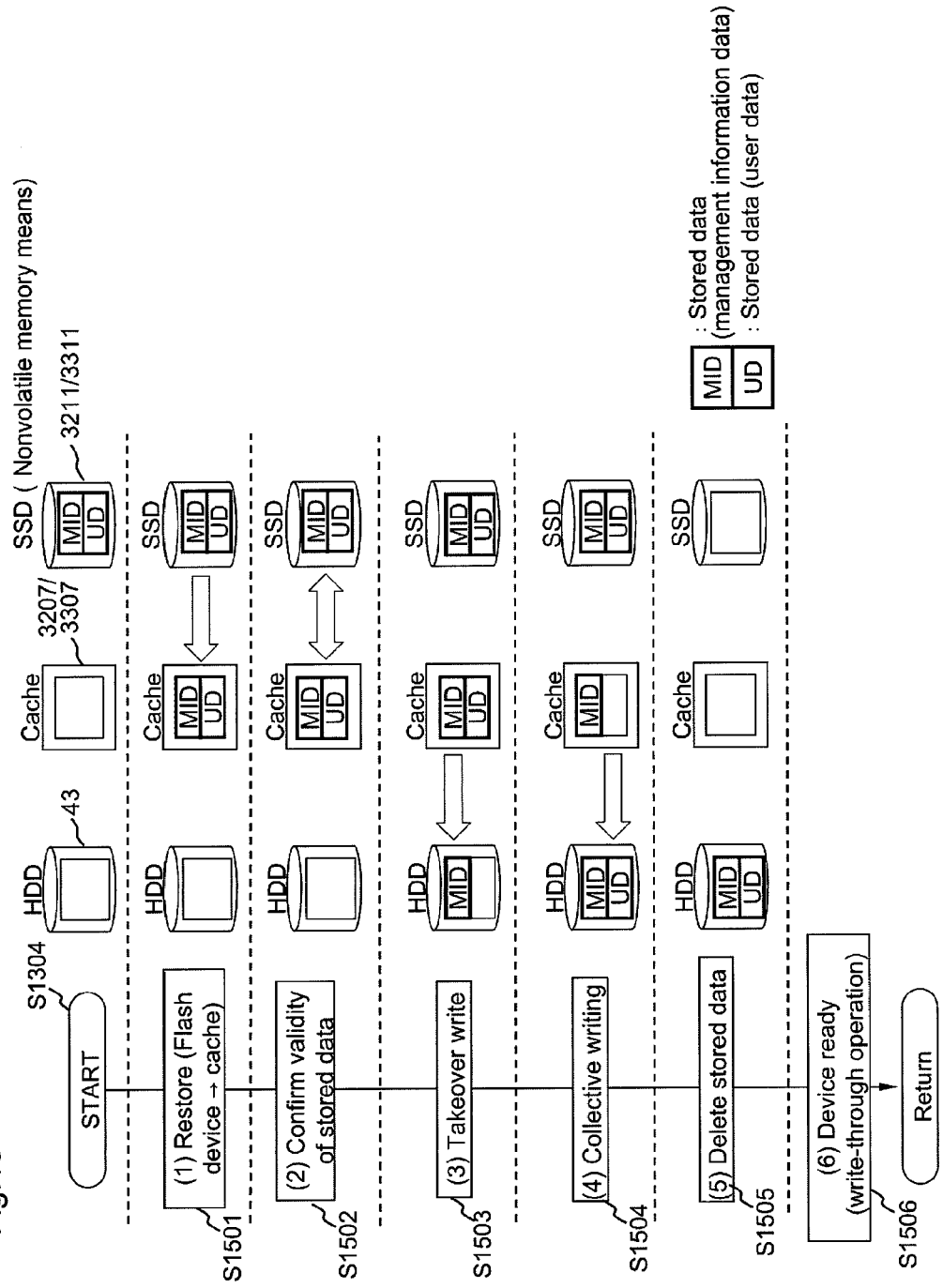
FIG. 15 is a flowchart describing a restarting process via write-through in the power recovery process according to the present invention.

On the other hand, if the set value is "0x02", the controller determines that the mode is a startup mode (write-through restart mode) and executes a device startup process via write-through of step S1304 (FIG. 15). In the write-through restart process S1304, the operation illustrated in FIG. 15 is performed.

At first, the CPU 3203 restores the management information data and the user data in the flash device 3211/3311 to the cache memory 3207/3307 (step S1501). Next, the controller compares the data stored in the flash device 3211/3311 with the data stored in the cache memory 3207/3307 so as to confirm the validity (data consistency) of the stored data in the cache memory 3207/3307 (step S1502). If the validity of the stored data cannot be confirmed, the controller abandons the storage data in the cache memory 3207/3307, and executes the data restoration of step S1501 again.

After confirming validity of the stored data, the controller writes the management information data out of the stored data in the cache memory 3207 or 3307 into the HDD 43 (step S1503, takeover writing). Next, the controller writes the user data collectively into the HDD 43, and after completing writing, deletes the user data from the cache memory 3207/3307 (step S1504, collective writing). Thereafter, the controller deletes the management information data in the cache memory 3207/3307 and the data in the flash device 3211/3311 (both the management information data and the user data) (step S1505).

Finally, the device is set to the startup complete state, but the controller sets the mode for writing data to the cache memory to the "write-through mode (FIG. 6A)" instead of the "write-back mode (FIG. 6B)". The reason for this is because immediately after restarting, the battery is consumed and there may not be enough battery capacity for performing cache backup again. Therefore, simultaneously when writing data into the cache memory 3207, data is written into the HDD 43. By performing this writing operation, data can be protected even when blackout occurs again and the data in the cache memory 3207 is lost, since the data in the cache memory 3207 is stored in the HDD 43.

Further, by storing the status information of the device (such as not started or started via write-through mode) in the CS/DS 3204, it can be used effectively as a shifting process information during which the device shifts to a startup state or a normal state (a state in which data can be written via write-back mode to the cache memory).

Figure 12:
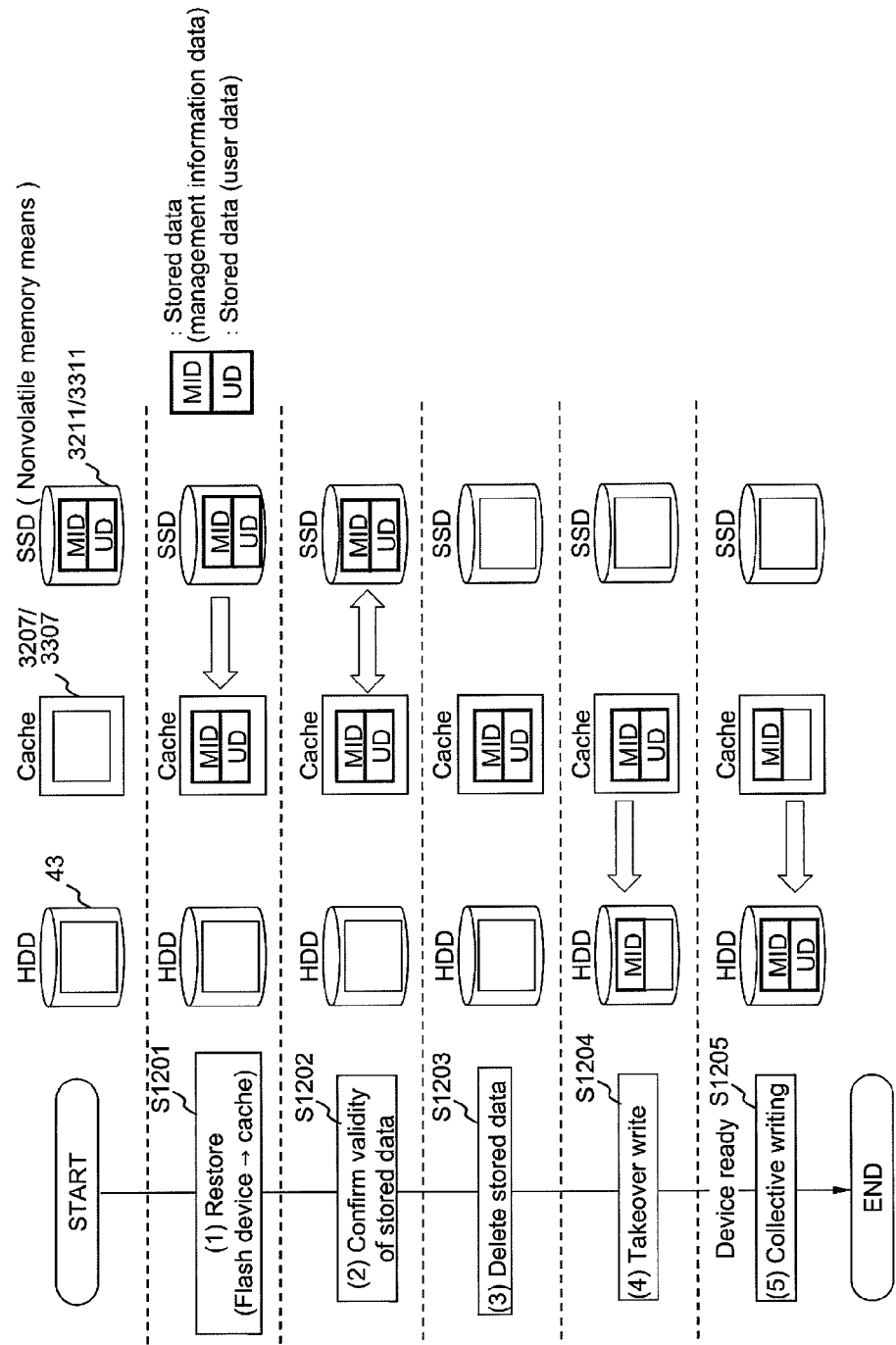
FIG. 12 is a flowchart describing a power recovery process according to the present invention.

Another method of the restarting process described in FIG. 15 (execution of starting process for recovering a device from data backup state) will be described with reference to FIG. 12. It is assumed that flash backup is performed during blackout, and data (such as management information data and user data) is stored in the flash device 3211/3311 which is a non-volatile memory means.

When blackout is resolved and power supply is resumed, the management information data and the user data of the flash device 3211/3311 are restored to the cache memory 3207/3307 (step S1201). Next, the data in the flash device 3211/3311 and the data stored in the cache memory 3207/3307 are compared, and the validity (data consistency) of the stored data in the cache memory 3207/3307 is confirmed (step S1202). When the validity (data consistency) of stored data is confirmed, the management information data and the user data stored in the flash device 3211/3311 are deleted (step S1202).

If the validity of the stored data cannot be confirmed, the data stored in the cache memory 3207/3307 is abandoned and the data restoration of step S1201 is performed again. Next, the management information data from the stored data in the cache memory 3207 or 3307 is written to the HDD (step S1204, takeover writing). Then, the storage device 3 is returned to the normal status and the restarting process is ended.

The writing of user data in the cache memory to the HDD 43 is performed either periodically or at an arbitrary timing in an asynchronous manner such as when there are a few accesses to the HDD 43. In that case, the data in the cache memory that has not been written into the HDD is collectively written into the HDD 43 (step S1205, collective writing).

Based on the above arrangement and operation, the backed-up data can be restored in the cache memory without fail, and the storage device can be returned to the state prior to blackout. In other words, the completeness and uniqueness of the data can be ensured. Further according to the method shown in FIG. 15, even when blackout occurs again during saving of data from the cache memory 3207 to the HDD 43, since the data in the flash memory 3211 is not deleted, the data in the cache memory 3207 can be protected regardless of the remaining capacity of the battery.

Figure 13A:
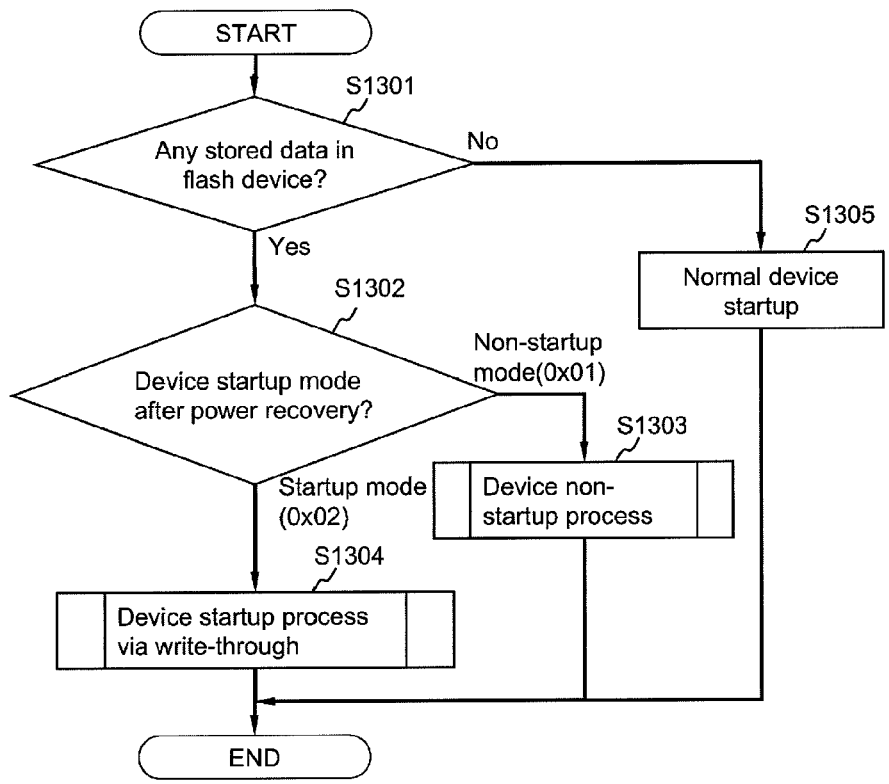
FIG. 13A is a flowchart describing a power recovery process according to the present invention.
Figure 13B:
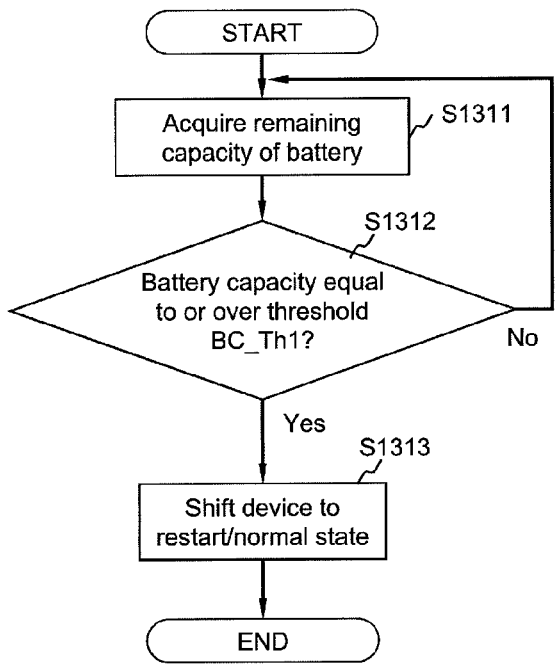
FIG. 13B is a flowchart describing a process for shifting to the normal state of the system after power recovery according to the present invention.
Figure 14:
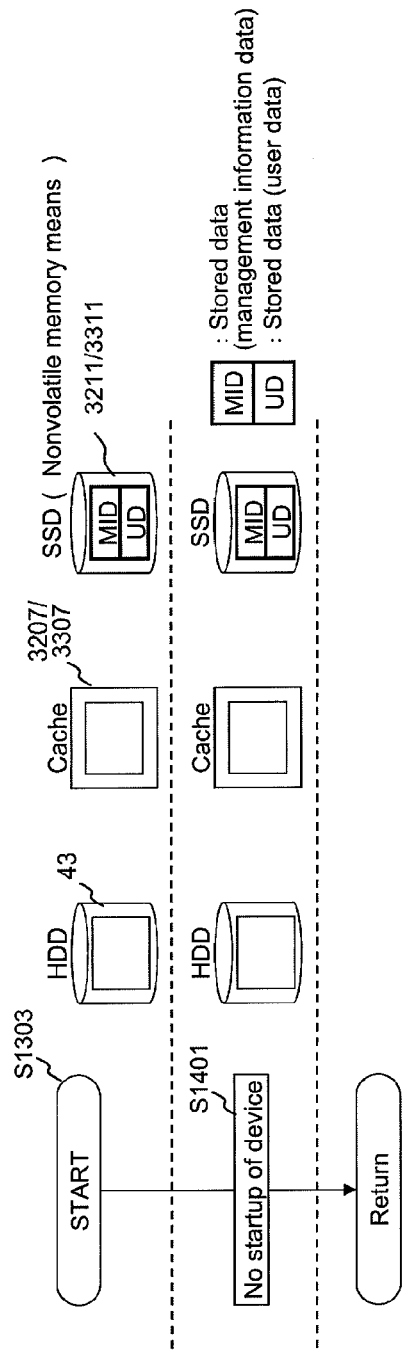
FIG. 14 is a flowchart describing a process for inhibiting startup in the power recovery process according to the present invention.

FIG. 13B is a process flow for shifting the device to a restart state or a normal state either after not starting up the storage device according to FIG. 13A or after starting the device via the write-through mode. The CPU 3203 of the controller unit 320 acquires the battery remaining capacity (charging capacity) information from the battery capacity management table 3000 (step S1311). The CPU 3203 determines whether the acquired battery remaining capacity exceeds a predetermined battery capacity threshold BC_Th1 (for example, 80% of the fully charged capacity) or not (step S1312).

Further, the setting of the battery capacity threshold BC_Th1 is performed via the storage management software HSNM 200 by entering a ratio to a setting area 19022 on the mode select screen 1900 of FIG. 19. When the current remaining capacity of the battery is not more than the battery capacity threshold BC_Th1 ("No" in step S1312), the CPU 3203 repeatedly acquires the battery remaining capacity (charged capacity) information from the battery capacity management table 3000 until the capacity exceeds the threshold. On the other hand, if the current remaining capacity of the battery is equal to or exceeds the battery capacity threshold BC_Th1 ("Yes" in step S1312), the CPU 3203 shifts the device to the device restart state or the normal state of step S1313.

According to step S1313, the current state of the device is confirmed via the device status information stored in the CS/DS 3204. When the device is not started, the CPU 3203 executes the restarting process of FIG. 15 and starts the device. After starting the device, the writing of data to the cache memory 3207 is set to the write-back mode, and the device is set to normal operation (normal state). Further, when the device is started but set in a write-through mode, the CPU 3203 sets the writing of data to the cache memory 3207 to the write back mode, and the device is set to normal operation (normal state).

According to the above-described arrangement and operation, even if blackout occurs again after restarting the device, the backed up data can be restored and the storage device can be returned to a state equivalent to the state prior to blackout. In other words, the completeness and uniqueness of data can be maintained. Even further, the availability of the storage device can be improved since the charging capacity of the battery can be recovered rapidly without deteriorating the performance of the storage device.

<Problem of Restarting Device During Power Recovery (Inconsistent Synchronization Among Controllers)>

Figure 16:
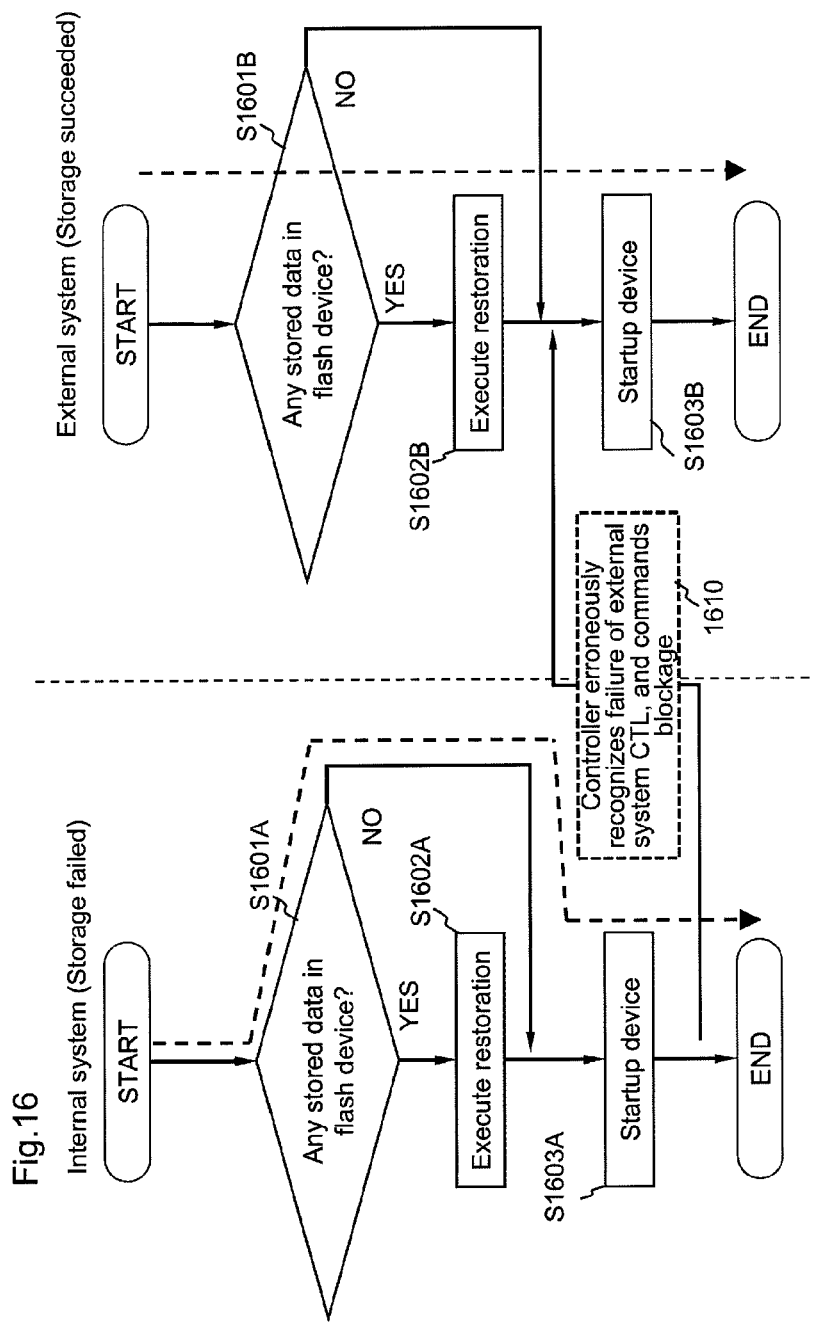
FIG. 16 is a flowchart describing a flow of inconsistent synchronization between controller units according to the prior art.

Now, the problem during restarting of the storage device 3 after power recovery will be described in detail with reference to FIG. 16. In FIG. 16, supposedly, the left side controller unit 320 is referred to as "internal system" ("self-system" or "own-system") and the right side controller unit 330 is referred to as "external system" ("other-system"). Further, it is assumed that during blackout, memory data backup has "failed" in the controller unit 320 of the internal system while backup has "succeeded" in the controller unit 330 of the external system. In this state, when blackout has resolved and power supply has restarted, the two controller units simultaneously start the restarting process.

In the controller unit 320 of the internal system, the CPU 3203 confirms whether data is stored in the flash device 3211 or not (step S1601A). In the controller unit 320, the data backup to the flash memory device during blackout has "failed", so the procedure advances to the "No" branch in step S1601A. After branching, the CPU 3203 begins to start up the device (such as the whole controller unit 320 or the drive controller unit 41) (step S1603A) without executing the restoration process (step S1602A).

On the other hand, in the controller unit 330 of the external system, the CPU 3303 confirms whether data is stored in the flash device 3311 or not (step S1601B). In the controller unit 330, the data backup to the flash memory device during blackout has "succeeded". Therefore, the procedure advances to the "Yes" branch in step S1601B, and the CPU 3303 executes the restoration process (step S1602B).

The restoration process is a process of writing the large amount of GB (Giga Byte)-unit data saved in the flash device back into cache memory 3307 or the cache memory 3307 and the HDD 433. After completing the restoration process, the startup of the device (such as the whole controller unit 330 or the drive controller unit 44) is started (step S1603B).

During the process of starting up the device, the controllers run a check on whether the other controller has any abnormality. In the present example, the controller unit 320 of the internal system does not perform the restoration operation, so it will return to the normal operation state faster than the controller unit 330 of the external system. At this time, the controller unit 330 of the external system is still under restoration operation, and the whole controller unit 330 has not yet returned to the normal operation state.

Therefore, the controller unit 320 of the internal system inquires the operation status of the controller unit 330 of the external system via the internal I/F 370. Since the controller unit 330 of the external system has not returned to the normal operation state, the controller unit 320 of the internal system erroneously recognizes that abnormality has occurred to the controller unit 330 of the external system. Then, the controller unit 320 of the internal system outputs a blockage command (inhibiting startup of the device and ordering shutdown thereof) to the controller unit 330 of the external system. There was a drawback according to the system that even though data was saved correctly to the flash device 3311 of the controller unit 330 of the external system, the storage device 3 could not be restarted using the saved data, that is, the device may not be returned to the state prior to blackout.

<State Consistency Process of the Controller Unit During Power Recovery>

Figure 17:
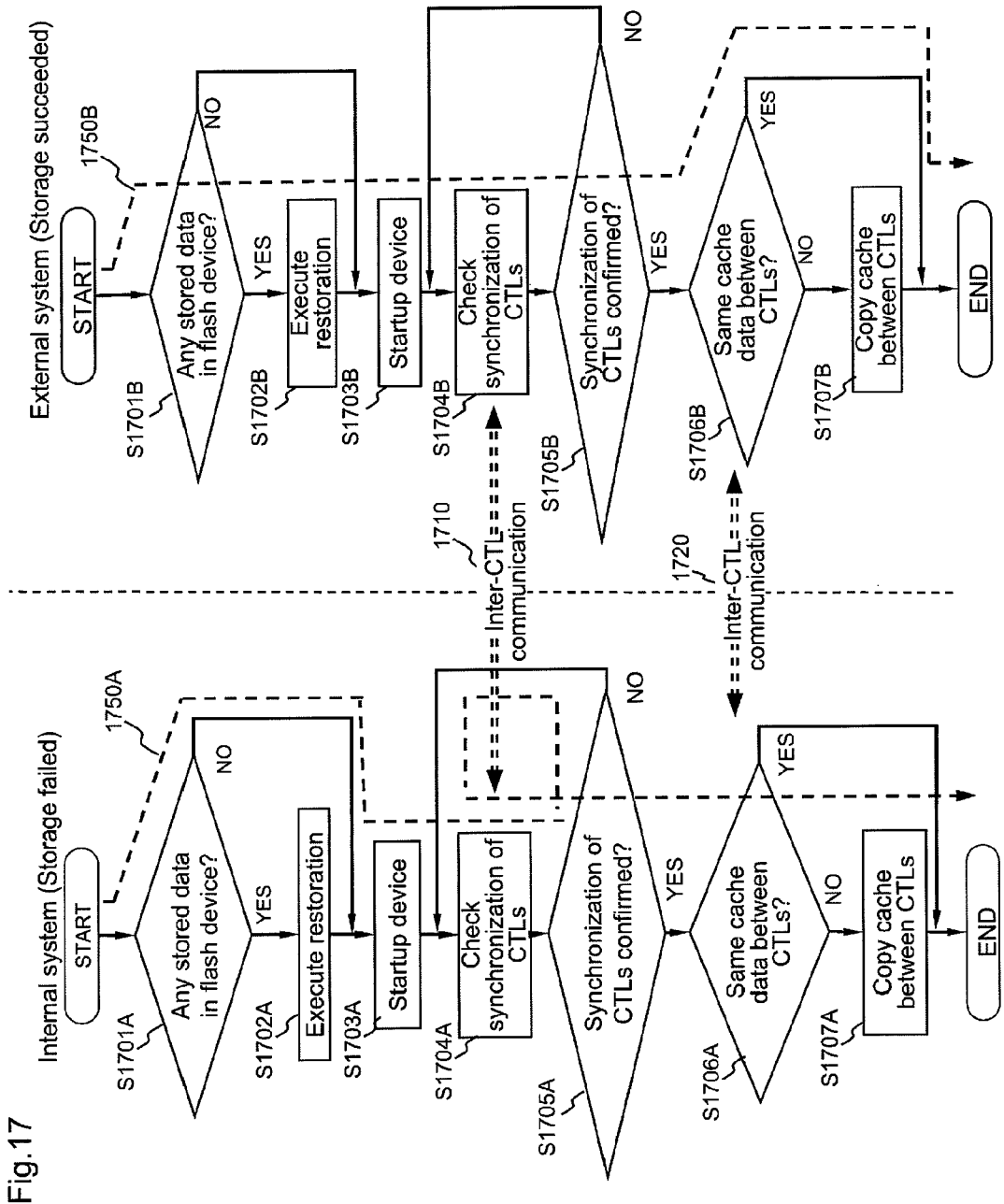
FIG. 17 is a flowchart describing the synchronization process between controller units in a dual system configuration according to the present invention.
Figure 18:
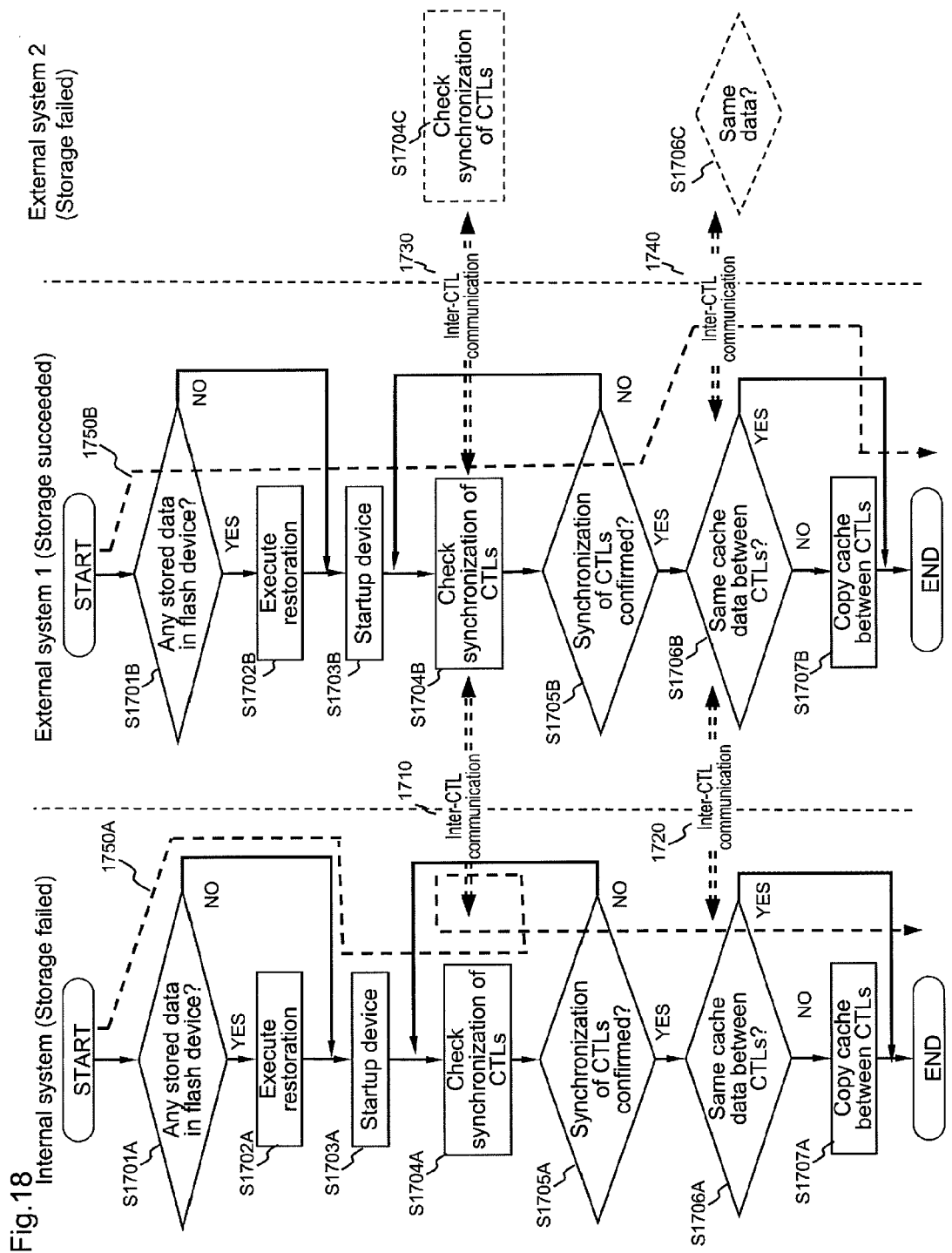
FIG. 18 is a flowchart describing a synchronization process among controller units in a triple system configuration according to the present invention.

Therefore, the present invention enables to match the states (maintain consistency) of controller units by performing a synchronization process of the controller units, mutually confirming the contents of the cache memories and matching the same in FIG. 17 or FIG. 18. In FIG. 17, the left side controller unit 320 is referred to as the "internal system" and the right side controller unit 330 is referred to as the "external system". Moreover, it is assumed that during blackout, the memory backup has "failed" in the controller unit 320 of the internal system while memory backup has "succeeded" in the controller unit 330 of the external system. In FIG. 18, the number of systems is increased to three (an external system 2 is added to the internal system and the external system (external system 1)). First, the actual process of FIG. 17 will be described.

When blackout is resolved and power supply is resumed, two controller units start the restarting process simultaneously. In the controller unit 320, the CPU 3203 confirms whether data is stored in the flash device 3211 or not (step S1701A). In the controller unit 320 of the internal system, the data backup to the flash memory device during blackout has "failed", so the procedure advances to the "No" branch in step S1701A, and the restoration process (step S1702A) is not performed. After branching, the CPU begins to start up the device (such as the whole controller unit 320 or the drive controller unit 41) (step S1703A).

After completing startup of the device, the synchronization of the controller unit 320 and the controller unit 330 is checked via inter-controller unit communication 1710 (S1704A). The synchronization can be checked via methods such as the CPU 3203 transmitting the state of the CPU itself or the state of the internal system controller unit 320 to the CPU 3303 of the controller unit 330 and awaits a response, or the CPU 3203 inquiring the state of the controller unit 330 or the CPU 3303.

If synchronization of controller units is confirmed, step S1706A and the subsequent steps are performed. If synchronization of controller units cannot be acquired, the synchronization check among controller units of step S1704A is performed again and steps 1704A and 1705A are repeatedly performed until synchronization is confirmed. However, if synchronization cannot be confirmed after performing the synchronization check for a predetermined number of times, it can be determined that failure has occurred.

On the other hand, in the controller unit 330, the CPU 3303 confirms whether data is stored in the flash device 3311 or not (step S1701B). In the controller unit 330 of the external system, the data backup to the flash memory device during blackout has "succeeded", so the procedure advances to the "Yes" branch in step S1701B and the CPU 3303 executes the restoration process (step S1702B).

The restoration process is a process of writing the large amount of GB (Giga Byte)-unit data saved in the flash device back into cache memory 3307 or the cache memory 3307 and the HDD 433. After completing the restoration process, the startup of the device (such as the whole controller unit 330 or the driver controller unit 44) is started (step S1703B).

After completing startup of the device, synchronization of the controller unit 330 and the controller unit 320 is checked via the inter-controller unit communication 1710 (S1704B). Similar to the controller unit 320, the synchronization can be checked via methods such as the CPU 3303 sending the state of the CPU itself or the state of the internal system controller unit 330 to the CPU 3203 of the controller unit 320 and awaits a response, or the CPU 3303 inquiring the state of the controller unit 320 or the CPU 3203.

If synchronization of controller units is confirmed, the process of step S1706B and subsequent steps is performed. If synchronization of controller units cannot be acquired, the synchronization check among controller units of step S1704B is performed again and steps 1704B and 1705B are repeatedly performed until synchronization is confirmed. However, if synchronization cannot be confirmed after performing the synchronization check for a predetermined number of times, it can be determined that failure has occurred.

After confirming synchronization of controller units, whether the data of the cache memory 3207/3307 of the respective systems is identical or not is checked via the inter-controller unit communication 1720. If they are not identical ("No" in step S1706A/1706B), the contents of the respective cache memories are exchanged between controller units and data is matched. Thereafter, the CPU writes the matched data in the respective cache memories, and the uniformity (consistency) of the contents of the cache memories is maintained (step S1707A). Further, the inter-controller unit communication 1710 and 1720 is performed via the internal I/F.

In FIG. 17, the memory backup of the internal system (controller unit 320) has "failed" and there is no stored data in the flash device, but the memory backup of the external system (controller unit 330) has "succeeded". Thus, by copying the content of the cache memory of the external system (controller unit 330) to the cache memory of the internal system (controller unit 320) having failed data backup, the soundness of data of the overall storage device 3 can be realized.

Furthermore, the flash devices of the internal system (controller unit 320) and the external system (controller unit 330) may include stored data whose backup has partially succeeded (70% of the whole cache memory capacity). By combining the respectively stored data and matching the same (deleting the overlapped portions), the whole data that should have been subjected to backup can be restored.

According to the above-described arrangement and operation (synchronization of controller units via inter-controller unit communication and matching of cache memory contents), the overall reliability and availability of the storage device 3 can be improved.

The process of recovering after power recovery when the controller units is triplicated will be described with reference to FIG. 18. According to the present embodiment, as shown in FIG. 18, the number of controller units is three (triplicated) compared to the embodiment of FIG. 17 in which the number of controller units is two (duplicated). The flow of the process is similar to FIG. 17. The difference with respect to FIG. 17 is that in steps S1704A/S1704B/S1704C, the synchronization among three controller units (internal system and external system 1, external system 1 and external system 2, and internal system and external system 2) is confirmed via inter-controller unit communications 1710 and 1730, and that in steps S1706A/S1706B/S1706C, the uniformity of contents of the respective cache memories of the three controller units is confirmed.

Lastly, the mode select screen 1900 of the storage management software HSNM 200 of the management host 20 will be described with reference to FIG. 19. The mode select screen 1900 is composed of a data backup mode related area 1901 and a device restart mode related area 1902. The data backup mode related area 1901 includes a data backup mode select area 19011, a data backup time (time for performing backup of the data in the cache memory 3207, wherein after the elapse of the set time, data is saved in the flash device 3211) entry area 19012, and a ratio 19013 of the area used as write cache of the cache memory 3207. Further, the data backup mode related area 1901 includes a current power supply related status area 19014, and the current power supply related status area 19014 displays a battery remaining capacity 19015, a data backup available time 19016 and a write cache area ratio 19017.

Further, the device restart mode related area 1902 is composed of a device restart mode select area 19021, and an area 19022 for setting the threshold BC_Th1 of the ratio of battery capacity for starting the restarting operation from the restart inhibited state or the ratio of battery capacity for shifting the storage device to the normal state after starting restarting operation. As described, the remaining capacity of the battery or the like can be checked, and the mode for performing backup of data or the mode for restarting the device after power recovery can be selected on the screen 1900. As described, the usability of the storage device 3 can be improved.

Also according to the present embodiment, after confirming synchronization of the controller units, the data in the cache memories are exchanged and matched so as to completely match the contents of the respective cache memories, so that the reliability and availability of the whole storage device 3 can be improved.

INDUSTRIAL APPLICABILITY

The present invention can be applied to image processing apparatuses such as largescale computers, servers and personal computers, or to information storage devices such as storage systems.

REFERENCE SIGNS LIST

1 Information system
3 Storage device
10, 11 Host
20, 21 Management host
30 Controller chassis
40 Drive chassis
41, 44 Drive controller unit
42, 45 Expander
43 HDD
50 Network
60 Client terminal
300, 340 Power supply
301, 341 Power supply control unit
302 AC/DC converter
303 DC/DC converter
304 External power supply
310, 311, 312, 350 Battery
320, 330 Controller
370 Internal I/F
3201, 3301 Management I/F
3202, 3302 FE (Front End)_I/F
3203, 3303 CPU
3204, 3304 Memory for system control (CS/DS)
3205, 3305 PCH (Port Controller Hub)
3206, 3306 DCTL (Data controlling LSI)
3207, 3307, 3207A, 3207B Cache memory
3208, 3308 LAN (Local Area Network) controller
3209, 3309 FCTL+ (Flash Controller)
3210, 3310 ECTL+ (Enclosure Controller)
3211, 3311 Nonvolatile memory device
3212, 3312 BCTL (Bus Controller)
3213, 3313 MP (Micro Processor)
3214, 3314 SATA_CTL 3215, 3315 BE (Back End)_I/F
32071 Read data storage area
32072 Write data storage area
100, 110, 600 application
200, 210 Storage management software
600 application
2000 LU-RG-HDD management table
2001 LU number
2002 RG number
2003 HDD number
3000 Battery capacity management table
4000 Data backup mode management table
4100 Restart mode management table
1900 Mode select screen
1901 Data backup mode related area
1902 Device restart mode related area

The invention claimed is:

1. A storage system coupled to a computer or a management computer, the storage system comprising one or more controller units, one or more power supply units, one or more battery units, and a drive unit having a plurality of nonvolatile devices the one or more controller units comprising:
a control unit;
a volatile memory; and
a nonvolatile memory device,
the one or more power supply units being coupled to the one or more battery units and including an external power input unit and a power supply control unit,
wherein the volatile memory includes a read data storage area for storing read data read from a plurality of nonvolatile devices, and a write data storage area for storing write data written from the computer, and when the storage system selects to retain data stored in the volatile memory, a capacity of the write data storage area of the volatile memory is increased or decreased based on a capacity of a battery, wherein, when a power supply from an exterior is interrupted, the one or more controller units determine content of interruption of the power supply from the exterior, and based on a determination result and a data backup mode information set via the management computer, select whether to continue retaining the data stored in the volatile memory or to store the data in the nonvolatile memory device and retain the data therein, and
wherein a selection is made as to whether to inhibit restarting of the storage system or to restart the storage system and select a write-through mode for write access to the volatile memory when the power supply from the exterior is resumed.

2. The storage system according to claim 1, wherein when the storage system selects to retain the data stored in the volatile memory, the storage system further selects whether to keep the data stored in the volatile memory or to store and retain the data in the nonvolatile memory device based on a capacity of the battery.

3. The storage system according to claim 2, wherein the data is composed of a management information, data and a user data.

4. The storage system according to claim 1, wherein when the storage system selects to retain data in the volatile memory, a total capacity of the volatile memory is increased or decreased based on the capacity of the battery.

5. The storage system according to claim 4, wherein a mode for writing data to the write data storage area of the volatile memory is selected between a write-back mode and a write-through mode based on the capacity of the battery.

6. The storage system according to claim 1, wherein after inhibiting restarting of the storage system or after restarting the storage system, a remaining battery capacity is monitored, and when the remaining battery capacity exceeds a predetermined threshold, restarting of the storage system is started or the mode of write access to the volatile memory is changed from the write-through mode to the write-back mode.

7. The storage system according to claim 6, wherein during restarting of the storage system after the power supply from the exterior is resumed, the following steps are performed:
(1) migrating data from the nonvolatile memory device to the volatile memory;
(2) confirming data consistency by comparing data in the nonvolatile memory device and the data migrated to the volatile memory;
(3) after confirming consistency, deleting the data in the nonvolatile memory device;
(4) storing management information data in the volatile memory into the nonvolatile memory device;
(5) shifting the storage system to a normal state; and
(6) storing user data in the volatile memory into the nonvolatile memory device and deleting the user data in the volatile memory.

8. The storage system according to claim 7, wherein during restarting of the storage system after the power supply from the exterior is resumed, the following steps are additionally performed:
(7) checking synchronization of controller units; and
(8) mutually checking contents of data stored in volatile memories of the controller units and matching the data.

9. The storage system according to claim 8, wherein the remaining capacity of the battery, a backup available time, and a total capacity or the write data storage area capacity of the volatile memory are displayed, and settings of a data backup mode, the backup available time, the write data storage area capacity of the volatile memory, and settings of the restart mode of the storage system or a threshold of the capacity of the battery are performed via the management computer.

10. The storage system according to claim 6, wherein during restarting of the storage system after the power supply from the exterior is resumed, the following steps are performed:
(1) migrating data from the nonvolatile memory device to the volatile memory;
(2) confirming data consistency by comparing data in the nonvolatile memory device and the data migrated to the volatile memory;
(3) after confirming consistency, storing management information data in the volatile memory into the nonvolatile memory device;
(4) storing user data in the volatile memory into the nonvolatile memory device and deleting the user data in the volatile memory; and
(5) deleting management information data from the volatile memory.

11. The storage system according to claim 10, wherein during restarting of the storage system after the power supply from the exterior is resumed, the following steps are additionally performed:
(6) checking synchronization of control units; and
(7) mutually checking contents of data stored in volatile memories of the control units and matching the data.

12. The storage system according to claim 11, wherein the remaining capacity of the battery, a backup available time, and a total capacity or the write data storage area capacity of the volatile memory are displayed, and settings of a data backup mode, the backup available time, the write data storage area capacity of the volatile memory, and settings of the restart mode of the storage system or a threshold of the capacity of the battery are performed via the management computer.

13. A data backup method of a storage system coupled to a computer and a management computer, the storage system comprising:
- a controller unit comprising a control unit, a volatile memory, and a nonvolatile memory device;
- a power supply unit comprising an external power input unit and a power supply control unit;
- a battery unit; and
- a drive unit comprising a plurality of nonvolatile devices, the method comprising:
- detecting interruption of a power supply from an exterior;
- determining contents of the interruption of the power supply from the exterior;
- acquiring a backup mode information set via the management computer; and
- selecting whether to continue retaining data stored in the volatile memory in the volatile memory or to store the data in the nonvolatile memory device and retain the data therein based on a determination result and the backup mode information set,
- wherein the volatile memory includes a read data storage area for storing read data read from a plurality of nonvolatile devices, and a write data storage area for storing write data written from the computer, and when the storage system selects to retain data stored in the volatile memory, a capacity of the write data storage area of the volatile memory is increased or decreased based on a capacity of the battery, and
- wherein a selection is made as to whether to inhibit restarting of the storage system or to restart the storage system and select a write-through mode for write access to the volatile memory when the power supply from the exterior is resumed.

14. A system restarting method of a storage system coupled to a computer or a management computer, the storage system comprising:
- a controller unit comprising a control unit, a volatile memory, and a nonvolatile memory device;
- a power supply unit comprising an external power input unit and a power supply control unit;
- a battery unit; and
- a drive unit comprising a plurality of nonvolatile devices, the method comprising:
- detecting interruption of a power supply from an exterior;
- determining contents of the interruption of the power supply from the exterior;
- acquiring a backup mode information set via the management computer;
- selecting whether to continue retaining data stored in the volatile memory in the volatile memory or to store the data in the nonvolatile memory device and retain the data therein based on a determination result and the backup mode information set;
- detecting resumption of the power supply from the exterior;
- checking stored data in the nonvolatile memory device;
- storing the stored data in the nonvolatile memory device into the volatile memory and the nonvolatile memory device;
- confirming synchronization of control units;
- mutually confirming contents of data in volatile memories of the control units; and
- matching the contents of the data in the volatile memories,
- wherein the volatile memory includes a read data storage area for storing read data read from a plurality of nonvolatile devices, and a write data storage area for storing write data written from the computer, and when the storage system selects to retain data stored in the volatile memory, a capacity of the write data storage area of the volatile memory is increased or decreased based on a capacity of a battery, and
- wherein a selection is made as to whether to inhibit restarting of the storage system or to restart the storage system and select a write-through mode for write access to the volatile memory when the power supply from the exterior is resumed.

15. The method for restarting the storage system according to claim 14, wherein storing the stored data in the nonvolatile memory device into the volatile memory and the nonvolatile memory device comprises:
(1) migrating data from the nonvolatile memory device to the volatile memory;
(2) confirming data consistency by comparing data in the nonvolatile memory device and the data migrated to the volatile memory;
(3) deleting the data in the nonvolatile memory device after confirming consistency;
(4) storing management information data in the volatile memory into the nonvolatile memory device;
(5) shifting the storage system to a normal state; and
(6) storing user data in the volatile memory into the nonvolatile memory device and deleting the user data in the volatile memory.

16. The method for restarting the storage system according to claim 14, wherein storing the stored data in the nonvolatile memory device into the volatile memory and the nonvolatile memory device comprises:
(1) migrating data from the nonvolatile memory device to the volatile memory;
(2) confirming data consistency by comparing data in the nonvolatile memory device and the data migrated to the volatile memory;
(3) storing the management information data in the volatile memory into the nonvolatile device after confirming consistency;
(4) storing user data in the volatile memory into the nonvolatile device and deleting the user data in the volatile memory; and
(5) deleting management information data from the volatile memory.

* * * * *